(12) United States Patent
Yezrielev et al.

(10) Patent No.: US 6,506,243 B1
(45) Date of Patent: *Jan. 14, 2003

(54) ENVIRONMENTALLY PREFERRED FLUIDS AND FLUID BLENDS

(75) Inventors: Albert Ilya Yezrielev, Houston, TX (US); Richard Henry Schlosberg, Bridgewater; George Andrew Knudsen, Scotch Plains, both of NJ (US); Thomas Marshall Larson, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/305,548

(22) Filed: May 5, 1999

Related U.S. Application Data

(60) Provisional application No. 60/084,347, filed on May 5, 1998, and provisional application No. 60/087,150, filed on May 29, 1998.

(51) Int. Cl.[7] ................................................. C08J 3/02
(52) U.S. Cl. ..................... 106/311; 106/236; 106/237; 106/238; 106/239; 252/364; 244/285
(58) Field of Search .......................... 252/364; 106/236, 106/237, 238, 239, 311; 244/285

(56) References Cited

U.S. PATENT DOCUMENTS

| | | | |
|---|---|---|---|
| 6,048,471 A | 4/2000 | Henry | 252/364 |
| 6,280,519 B1 * | 8/2001 | Yezrielev et al. | 106/311 |

* cited by examiner

*Primary Examiner*—Mark Kopec
*Assistant Examiner*—Derrick G. Hamlin

(57) ABSTRACT

The invention concerns fluids that have a low reactivity with respect to ozone formation, blends thereof, and the replacement of conventional industrial solvents with said fluid or fluid blends in order to reduce tropospheric ozone formation.

99 Claims, No Drawings

ENVIRONMENTALLY PREFERRED FLUIDS AND FLUID BLENDS

CROSS-REFERENCE TO RELATED APPLICATIONS

This application claims the benefit of priority of U.S. Provisional Application Ser. No. 60/084,347, filed May 5, 1998, and Ser. No. 60/087,150, filed May 29, 1998.

FIELD OF THE INVENTION

This invention relates to the selection and use of environmentally preferred fluids and fluid blends which exhibit low or reduced reactivity with respect to ozone formation. These environmentally preferred fluids and fluid blends are useful in a number of applications, particularly as industrial solvents, and allow formulators an effective means to improve the environmental performance of their formulations or products.

BACKGROUND OF THE INVENTION

Fluid applications are broad, varied, and complex, and each application has its own set of characteristics and requirements. Proper fluid selection and fluid blend development have a large impact on the success of the operation in which the fluid is used. For instance, in a typical industrial coatings operation, a blend of several fluids is used in order to get an appropriate evaporation profile. Such a blend must also provide the appropriate solvency properties, including formulation stability, viscosity, flow/leveling, and the like. The fluid blend choice also affects the properties of the dry film, such as gloss, adhesion, and the like. Moreover, these and other properties may further vary according to the application method (e.g., spray-on), whether the substrate is original equipment (OEM), refinished, etc., and the nature of the substrate coated.

Other operations involving the use of fluids and fluid blends include cleaning, printing, delivery of agricultural insecticides and pesticides, extraction processes, use in adhesives, sealants, cosmetics, and drilling muds, and countless others. The term "fluid" encompasses the traditional notion of a solvent, but the latter term no longer adequately describes the possible function of a fluid or blend in the countless possible operations. As used herein the term "fluid" includes material that may function as one or more of a carrier, a diluent, a surface tension modifier, dispersant, and the like, as well as a material functioning as a solvent, in the traditional sense of a liquid which solvates a substance (e.g., a solute).

The term "industrial solvent" applies to a class of liquid organic compounds used on a large scale to perform one or more of the numerous functions of a fluid in a variety of industries. Relatively few of the large number of known organic compounds that could be used as fluids find use as industrial solvents. Fluids that are used in large quantities have heretofore been selected because they can be produced economically and have attractive safety and use characteristics in manufacturing, consumer and commercial environments. Examples of commercial solvents and their uses as industrial solvents are described in an article entitled "*Solvents, Industrial*", by Don A. Sullivan, Shell Chemical, Encyclopedia of Chemical Technology, 4th. ed., V. 22, pp.529–571(III) (1997).

In addition to the problems with fluid and fluid blend selection mentioned at the outset, there is also the problem that, in most applications, at least some of the fluid evaporates and can escape into the environment. Although many industrial coating operations, such as in original equipment manufacturing (OEM), utilize control equipment to capture or incinerate >95% of the solvent emissions, nevertheless in a majority of applications some of the solvents inevitably enters the atmosphere.

The United States Environmental Protection Agency (EPA) has developed National Ambient Air Quality Standards (NAAQS) for six pollutants: ozone, nitrogen oxides $(NO_x)$, lead, carbon monoxide, sulfur dioxide and particulates. Of all the NAAQS standards, ozone non-attainment has the greatest impact on solvent operations.

Solvents typically are volatile organic compounds (VOC), which are involved in complex photochemical atmospheric reactions, along with oxygen and nitrogen oxides $(NO_x)$ in the atmosphere under the influence of sunlight, to produce ozone. Ozone formation is a problem in the troposphere (low atmospheric or "ground-based"), particularly in an urban environment, since it leads to the phenomenon of smog. Since VOC emissions are a source of ozone formation, industrial operations and plants using solvents are heavily regulated to attain ozone compliance. As different regulations have been adopted, the various approaches to controlling pollution have evolved. Certain early regulations controlled solvent composition, while later regulations primarily concerned overall VOC reduction.

According to current VOC emission regulations in the U.S.A., solvents generally belong to one of two groups depending on their reactivity toward atmospheric photochemical ozone formation: (a) Negligible reactivity organic compounds which generate about the same or less quantity of ozone as would be produced by the same weight % as ethane. These organic compounds are exempt from the definition of a VOC and are not considered to be a VOC in any solvent (fluid) composition. There are numerous such compounds exempted by the EPA from the definition of VOC. However, a majority of such exempted compounds are halogenated derivatives which can possess one or more of the following deficiencies: toxicity, ozone depletion, or waste disposal or incineration problems. Other non-halogenated, oxygenated organic compounds, such as acetone and methyl acetate, have been exempted by the EPA, but such compounds have extremely high evaporation rates and high flammability so as to reduce their applicability in numerous applications. Other such organic compounds, such as tertiary butyl acetate which is under exemption consideration by the EPA, while having a significantly improved flammability level and evaporation rate, may be too chemically and thermally unstable for many applications. (b) All other oxygenated and hydrocarbon solvents are considered to be VOC's and treated by the EPA as equally (on a weight basis) polluting. A more recent U.S. regulation has combined VOC reduction with composition constraints. While the traditional source of emission reduction is large stationary industrial facilities, the EPA and other governmental entities have turned increasingly to consumer and commercial products for reduction in their solvent usage as an additional means to lower VOC emission and therefore ozone formation. Numerous government and trade publications discuss VOC's, and information is readily available on the Internet. See, for instance, http://www.paintcoatings.net/VOCW97.html.

Various measurements of reactivity with respect to ozone formation are known. For instance, reactivity can be measured in environmental smog chambers, or they may be calculated using computer airshed models. See, for instance, Dr. William P. L. Carter, "Uncertainties and Research Needs in Quantifying VOC Reactivity for Stationary Source Emission Controls", presented at the California Air Resources Board (CARB) Consumer Products Reactivity Subgroup Meeting, Sacramento, Calif. (Oct. 17, 1995).

There has also been developed a "$K^{OH}$ scale", which provides a relative scale of the reactivity of VOC with the OH radicals involved in the complex reactions that produce ozone. See, for instance, Picquet et al., *Int. J. Chem. Kinet.* 30, 839–847 (1998); Bilde et al., *J. Phys. Chem. A* 101, 3514–3525 (1997).

Numerous other reactivity scales are known and new reactivity scales are constantly being developed. Since this is a rapidly changing area of research, the most up-to-date information is often obtained via the Internet. One example is Airsite, the Atmospheric Chemistry International Research Site for Information and Technology Exchange, sponsored by the University of North Carolina and the University of Leeds, at http://airsite.unc.edu.

Another way to measure the reactivity of a chemical in ozone formation is by using a technique developed by Dr. Carter (supra) at the Center for Environmental Research and Technology (CERT), University of California at Riverside. The CERT technique measures "incremental reactivities", the incremental amount of ozone that is produced when the chemical is added to an already polluted atmosphere.

Two experiments are conducted to measure the incremental reactivity. A base case experiment measures the ozone produced in an environmental smog chamber under atmospheric conditions designed to represent a polluted atmosphere. The second experiment called "the test case" adds the chemical to the "polluted" smog chamber to determine how much more ozone is produced by the newly added chemical. The results of these tests under certain conditions of VOC and nitrogen oxide ratios are then used in mechanistic models to determine the Maximum Incremental Reactivities (MIR), which is a measure of ozone formation by the chemical compound in question.

The State of California has adopted a reactivity program for alternative fuels based on this technique and the EPA has exempted several compounds due to studies conducted by CERT. See, for instance, Federal Register 31,633 (Jun. 16, 1995) (acetone); 59 Federal Register 50,693 (Oct. 5, 1994) (methyl siloxanes), Federal Register 17,331 (Apr. 9, 1998) (methyl acetate). CARB and EPA have uses a weight average MIR for regulatory purposes, wherein the weight average MIR of a solvent blend is calculated by summing the product of the weight percent of each solvent and its respective MIR value.

A list of compounds and their MIR values is available in the Preliminary Report to California Air Resources Board, Contract No. 95–308, William P. L. Carter, Aug. 6, 1998. A table of known MIR values may be found on the internet at http://helium.ucr.edu/~carter/index.html. CERT obtains other incremental reactivities by varying the ratios of VOC and nitrogen oxides. A detailed explanation of the methods employed and the determination of incremental reactivities and MIR scale may be found in the literature. See, for instance, *International Journal of Chemical Kinetics*, 28, 497–530 (1996); *Atmospheric Environment*, 29, 2513–2527 (1995), and 29, 2499–2511 (1995); and *Journal of the Air and Waste Management Association*, 44, 881–899 (1994); *Environ. Sci. Technol.* 23, 864 (1989). Moreover, various computer programs to assist in calculating MIR values are available, such as the SAPRC97 model, at http://helium.ucr.edu/~carter/saprc97.htm.

Any of these aforementioned scales could be used for regulatory purposes, however the MIR scale has been found to correlate best to peak ozone formation in certain urban areas having high pollution, such as the Los Angeles basin. MIR values can be reported as the absolute MIR determined by the CERT method or as a relative MIR. One common relative MIR scale uses the Reactive Organic Gas (ROG) in the base case as a benchmark. The Absolute Reactivity ROG is 3.93 g $O_3$ per gram ROG. This value is then the divisor for the absolute MIR of other VOCs, if MIR is cited relative to ROG. Absolute reactivities related to the ROG with the above mentioned absolute reactivity 3.93 are provided in "Updated Maximum Incremental Reactivity Scale for Regulatory Applications", Preliminary Report to California Air Resources Board, Contract No. 95–308, William P. Carter, Aug. 6, 1998. For the purposes of this invention and specification, unless otherwise specifically stated, all MIR values provided herein are Absolute MIR values. It is understood, however, that the Absolute MIR values can be converted to Relative MIR and back to Absolute MIR by division or multiplication of MIR by ROG.

Current regulations based on VOC emissions do not take into consideration the wide difference in ozone formation among non-exempt VOC compounds. For example, two non-exempt VOC compounds can have dramatically different ozone formation characteristics. Accordingly, current regulations do not encourage end users to minimize ozone formation by using low reactivity solvent compositions. Although there are federal and state regulatory trends toward requiring the reduction of the reactivity of solvents, the number of exempt solvents is small and in no way satisfies all the other properties required for an effective solvent such as good solvency, appropriate flash point, evaporation rate, boiling temperature, chemical and thermal stability.

Solvents currently viewed as essentially non-ozone producing are those which have reactivity rates in the range of ethane. Ethane has a measured reactivity based on the MIR method of 0.35. In fact, the EPA has granted a VOC exemption to certain solvents with reactivity values in this range including acetone (MIR=0.48) and methyl acetate (MIR=0.12).

However, the number of known materials having reactivities of 0.50 or less based on the MIR scale is relatively small. Moreover, it is a discovery of the present inventors that many if not most of the known fluids having acceptable reactivities with respect to ozone formation have other unfavorable performance characteristics, e.g., poor solvent properties, low flash point, inappropriate evaporation rate or volatility characteristics, unacceptable toxicity, unacceptable particulate matter formation, thermal or chemical instability and as such have limited, if any, applicability in industry. For example, ethane is a gas under ambient conditions and hence is a poor choice as an industrial solvent. Methyl acetate has an excellent MIR=0.12, but a low flash point of about −12° C.; acetone has an acceptable MIR=0.48, but is extremely flammable. As a further example, tertiary butyl acetate (t-butyl acetate) has an excellent MIR=0.21, but has limited thermal stability and is unstable to acid catalysts which may be present in an industrial operation.

Regarding particulate matter, the EPA has recently proposed standards for particulate matter under 2.5 $\mu$m (microns) in diameter ("PM2.5"). See 61 Federal Register 65638–65713 (Dec. 13, 1996). The proposal sets an annual limit, spatially averaged across designated air quality monitors, of 15 $\mu g/m^3$, and a 24-hour standard of 65 $\mu g/m^3$. Numerous discussions of this proposed standard are available on the internet, such as at http://www.cnie.org/nle/air~html, which cites numerous references (such as Wolf, "The Scientific Basis for a Particulate Matter Standard", Environmental Management (Oct. 26–31, 1996)). As far as the present inventors are aware, the prior art has not addressed ways of meeting these proposed requirements, much less in meeting these requirements in conjunction with ozone reduction requirements.

Moreover, the present inventors have also discovered that in many applications, VOC exempt solvents cannot be used as a one-for-one replacement for conventional solvents. Rather the formulator must balance a number of performance factors to develop an acceptable solvent or solvent blend for a particular application. Some factors are more relevant than others for specific applications. Nevertheless, many performance factors are similar for a number of applications.

Numerous attempts have been made to utilize the concept of "environmentally friendly" fluids in practical applications. For instance, there are a number of cleaning and/or stripping formulations available that are said to overcome certain prior art environmental problems. Examples include a binary azeotrope of octamethyltrisiloxane with n-propoxypropanol (U.S. Pat. No. 5,516,450), hexamethyidisiloxane and azeotropes and other mixtures thereof (U.S. Pat. No. 5,773,403), a nonazeotropic mixture including a halocarbon and an oxygenated organic solvent component having at least 3 carbons, which may be, for instance, dimethylcarbonate (U.S. Pat. No. 5,552,080), and a composition comprising an amide and a dialkyl carbonate (U.S. Pat. No. 4,680,133).

In addition, there have been a number of patents and literature references to materials intended to replace chlorofluorocarbons (CFCs) as, for instance, blowing agents. These efforts address stratospheric ozone depletion, which is the opposite phenomenon addressed by the present invention. Examples include the use of dimethoxymethane and cyclopentane (U.S. Pat. Nos. 5,631,305; 5,665,788; and 5,723,509), cyclopentane (U.S. Pat. No. 5,578,652) and polyglycols (U.S. Pat. No. 5,698,144). Still further, a "non-ozone depleting" solvent comprising halogenated compounds and an aliphatic or aromatic hydrocarbon compound having 6–20 carbon atoms is disclosed in U.S. Pat. No. 5,749,956. Similarly, U.S. Pat. No. 5,004,480 describes a method for reducing the levels of air pollution resulting from the combustion of diesel fuel in engines comprising blending dimethyl carbonate (DMC) with diesel fuel and combusting the blended fuel in engines. U.S. Pat. No. 5,032,144 also discusses the addition of oxygenates, including methyl pivalate (methyl 1,1,1-trimethyl acetate) to gasoline (as octane boosters). The problems addressed by these patents do not relate to the problem of industrial solvent evaporation.

WO 98/42774 discloses solvent-resin compositions which "do not contribute appreciably to the formation of ground based ozone". Organic solvents are selected based upon having "reaction rates with hydroxyl ion slower than ethane", and generally selected from halogenated solvents such as chlorobromomethane, methyl chloride, and the like. The only non-halogenated solvents that are suggested are n-alkanes ($C_{12}$–$C_{18}$), methyl and t-butyl acetate, acetone, dimethoxymethane, and mineral oils.

However, heretofore there has been no general solution to the problem of ground-based ozone formation that also provides for a fluid with appropriate performance attributes for an industrial solvent.

SUMMARY OF THE INVENTION

The present invention is directed to environmentally preferred fluids and fluid blends, their use as industrial solvents, and to a method of reducing ozone formation in a process wherein at least a portion of a fluid eventually evaporates.

The fluids and fluid blends of this invention have been selected by the present inventors for their actual or potential low reactivity in the complex photochemical atmospheric reaction with molecular oxygen ($O_2$) and nitrogen oxides ($NO_x$) to create ozone.

The present invention provides a means to reduce ozone formation by photochemical atmospheric reactions from a fluid solvent composition which is intended at application conditions to at least partially evaporate into the atmosphere. By properly selecting low reactive components for a fluid solvent composition, ozone formation can be reduced.

For the purposes of the present invention three groups of reduced ozone reactivity fluids and their uses are described and claimed: (a) Low Polluting Potential Fluid (LPPF), (b) Very Low Polluting Potential Fluid (VLPPF), and (c) Negligibly Polluting Potential Fluid (NPPF), according to the Absolute MIR numbers as follows:

| Fluid Solvent Designation | Absolute MIR |
| --- | --- |
| Low Polluting Potential Fluid | >1.0–<=1.5 gm ozone produced/gm fluid |
| Very Low Polluting Potential Fluid | >0.5–<=1.0 gm ozone produced/gm fluid |
| Negligibly Polluting Potential Fluid | <=0.5 gm ozone produced/gm fluid |

Where a composition is a blend of fluids, a weight average MIR (WAMIR) can be calculated as $$WAMIR = \Sigma Wi * MIRi$$

Where Wi is a weight fraction of solvent fluid component i and MIRi is the absolute MIR value of solvent fluid component i. For the purposes of the present invention, WAMIR will be the preferred method of measuring "ozone formation potential" or OFP.

It is preferred that the fluids and fluid blends also provide at least one other desirable performance property such as high flash point, low particulate formation, suitable evaporation rates, suitable solvency, low toxicity, high thermal stability, and chemical inertness with respect to non-ozone producing reactions, particularly with respect to acids which may be present in coating formulations.

In a particularly preferred embodiment, the fluids are used in a blend with known industrial solvents or other fluids which present an environmental problem with respect to MIR or lack one or more of the aforementioned desirable performance properties, so that the new fluid blends will have lower MIR than they would without the substituted low ozone formation reactivity fluid or have at least one of the aforementioned other desirable performance properties.

The present invention is also directed to a method of reducing ozone formation from atmospheric photochemical reactions in an application wherein a fluid eventually evaporates, at least partially, into the atmosphere, comprising replacing at least a portion of a fluid having a relatively higher MIR with a fluid having a relatively lower MIR. In the case where a blend results, it is preferred that the weighted average MIR of the blend be similar to or less than the MIR of a Low Polluting Potential Fluid, and most preferably similar to the MIR of a Negligibly Polluting Potential Fluid.

A fluid or fluid blend according to the present invention may be used in any process, e.g., any process using a fluid as a carrier, diluent, dispersant, solvent, and the like, on any scale, e.g., pilot plant scale, or industrial scale. It is preferred that the process be a stationary industrial process and it is preferred that the process is a non-combustion process. The present invention offers its greatest benefit from the standpoint of safety and health in large-scale industrial or commercial processes, particularly industrial coating processes or in formulations used in large quantities overall, albeit on a small scale for each individual use, e.g., by a consumer, such as in household paints, cosmetics, and the like. The ordinary artisan can readily differentiate between what is an industrial scale, pilot plant scale, and laboratory scale processes.

Accordingly, it is an object of the present invention to identify liquid organic compounds not heretofore identified as low reactivity solvent fluids and have not been used on a large scale commercial basis to reduce ozone formation.

It is another object of the present invention to provide a method of selecting fluids and/or fluid blends for applications which release fluids into the air and wherein there is a need to reduce ozone formation due to low atmospheric or ground-based (tropospheric) photochemical reactivity, in order to replace conventional solvents and/or solvent blends currently used in various compositions or processes.

It is another object of the present invention to provide a method of optimizing compositions comprising an evaporative fluid by selecting a fluid and/or fluid blend providing a reduced MIR as well as at least one additional performance attribute selected from high flash point, low particulate formation, suitable evaporation rates, suitable solvency, low toxicity, high thermal and chemical stability.

Still another object of the present invention includes the selection of fluids and/or fluid blends providing low reactivity in ozone formation having compatibility with a wide range of organic compounds of different polarity and molecular weights to make the fluids and/or fluid blends suitable for a wide range of compositions.

It is yet another object of the present invention to provide a method of reducing ozone formation caused by the release into the troposphere of a fluid or fluid blend in a process utilizing the fluid or fluid blend, comprising replacing at least a portion of the fluid with another fluid having a lower MIR.

A further object is to provide a method of reducing ground-based ozone formation due to fluid evaporation without resorting to expensive control equipment to capture all fluid emission into the environment.

Another object is to provide solvents that reduce ground base ozone formation without the use of halogenated solvents and their associated toxicity, incineration, and waste disposal issues.

These and other objects, features, and advantages will become apparent as reference is made below to a detailed description, preferred embodiments, and specific examples of the present invention.

DETAILED DESCRIPTION OF THE PREFERRED EMBODIMENTS

The fluids used in accordance with this invention have been selected for their low or reduced ozone formation potential (as reflected in their low or reduced MIR). The ozone formation potential of a composition or fluid solvent may be determined by any scientifically recognized or peer reviewed method including but not limited to, the MIR scale, the $K^{OH}$ scale, smog chamber studies, and modeling studies such as those performed by Dr. William P. L. Carter. Most references in the description of the present invention will be to the Absolute MIR scale measured in grams ozone produced/gram of fluid solvent. By "low MIR" is meant that the fluids have an MIR similar to or less than 1.5 gram of ozone per gram of the solvent fluid. By "reduced MIR" is meant that, in a process according to the present invention, a first fluid is replaced, in whole or in part, by a second fluid, the second fluid having an MIR lower than the first fluid. One of ordinary skill in the art can determine ozone reactivity of a material according to methods in numerous literature sources and tabulated data published in the open literature. It is mentioned that the terms "replace", "replacement", "replacing" and the like used herein are not to be taken as implying only the act of substituting a second fluid (having acceptable MIR as described herein) in a formulation for a first fluid that may have been previously used in that and similar formulation(s), with such first fluid has undesirable MIR as described herein. Rather, the terms are intended to include the formulations themselves comprising a mixture of the first and second fluids, or one or more such second fluid(s) without any of said first fluid(s), as the fluid system of the formulation. In the case where no such first fluid(s) are present, the concept of "replacement" is intended to refer to corresponding formulations that have only such first fluid(s) present instead of such second fluid(s) and therefore have a lower OFP.

The MIR is preferably determined by smog chamber studies, modeling studies, or a combination thereof, but is more preferably determined by "incremental reactivity", and still more preferably by the Absolute MIR, as discussed above.

The MIR of a fluid used in this invention is preferably less than or equal to 1.5 gram of ozone per gram of solvent fluid, more preferably less than or equal to 1.0 gram of ozone per gram of solvent fluid, and most preferably less than or equal to 0.5 gram of ozone per gram of solvent fluid, but the benefits of the present invention are realized if ozone formation is reduced by replacing a first fluid with a second fluid, in whole or in part, wherein the MIR of the second fluid is reduced from that of the first fluid, even if the second fluid has an MIR greater than 1.5 gram of ozone per gram of solvent fluid.

Therefore, it is preferred that the fluid according to the present invention have an MIR less than or equal to 1.50 and more preferably less than or equal to 1.00, still more preferably less than or equal to 0.50. In an even more preferred embodiment, the reactivity in ozone formation is preferably equal to or less than that of acetone and even more preferably equal to or less than that of ethane, by whatever scale or method is used, but most preferably by the MIR scale. Thus, in a more preferred embodiment, the fluid used in a composition according to the present invention will have an MIR less than or equal to 0.50, even more preferably less than or equal to 0.35.

Specifically preferred fluids according to the present invention include:

dialkyl carbonates, such as dimethyl carbonate (DMC), methyl ethyl carbonate, methyl isopropyl carbonate, methyl sec-butyl carbonate, methyl t-butyl carbonate, methyl neopentyl carbonate, and diisopropyl carbonate;

alkyl acetates, such as neopentyl acetate, ethylene glycol diacetate, 1,2-propylene glycol diacetate, 1,3-propylene glycol diacetate, 1,2-butylene glycol diacetate, 1,3-butylene glycol diacetate, 2,3-butylene glycol diacetate, neopentyl glycol diacetate;

dioxolanes such as 2,2-dimethyl dioxolane, 2,2,4-trimethyl dioxolane, 2,2,4,5-tetra methyl dioxolane;

pivalates such as methyl pivalate (methyl 1,1,1-trimethyl acetate), ethyl pivalate, isopropyl pivalate, t-butyl pivalate (TBP), neopentyl pivalate (NPP), 1,2-propylene glycol bis-pivalate (PGBP), ethylene glycol bis-pivalate, ethylene glycol monopivalate, 1,2-butylene glycol mono-pivalate (1,2-BGMP), 2,3-butylene glycol monopivalate (2,3-BGMP), 1,2-butylene glycol pivalate acetate (1,2-BGPA), 1,2-butylene glycol pivalate acetate (1,2-BGPA), 2,3-butylene glycol pivalate acetate (2,3-BGPA), ethylene glycol pivalate acetate, 1,2 propylene glycol monopivalate, neopentyl glycol mono pivalate, and 1,2-propylene glycol pivalate acetate;

isobutyrate compounds such as isopropyl isobutyrate, neopentyl isobutyrate, and neopentyl glycol mono isobutyrate; and 2,2,4,4-tetramethyl pentanonitrile (TMPN); isopropyl neononanoate; pivalonitrile; methyl 2,2,4,4-tetramethyl pentanoate (methyl neononanoate) and methyl 3,5,5 trimethyl hexanoate. Other preferred fluids are oxygenated (oxygen containing) organic compounds substantially free of moieties containing unsaturated carbon-carbon bonds or aromatic groups.

In the case of a blend, the weighted average MIR of the fluids in a composition according to the present invention will also have the perferred, more preferred, and most preferred MIR levels as discussed above.

In another preferred embodiment, wherein the blend results from replacing part of a first fluid with a second fluid and thereby reducing the weight average MIR, it is preferred that the weight average MIR be reduced 10%, more preferably 25%, still more preferably 50%, from the MIR calculated prior to the fluid replacement.

In yet another preferred embodiment, the Low Polluting Potential Fluids (LPPF), Very Low Polluting Potential Fluids (VLPPF), and Negligibly Polluting Potential Fluids (NPPF), as described herein will provide at least one other desirable performance property such as high flash point low particulate formation, suitable evaporation rates, suitable solvency, low toxicity, high thermal stability, and chemical inertness. Of course, it is more preferable that the fluid or blends have two or more of these performance attributes, and so on, so that the most preferred fluid or fluid blend has all of these performance attributes.

In the case of a process of reducing ozone formation, wherein a fluid according to the present invention replaces a fluid, at least in part, having a higher MIR, described in more detail below, it is preferred that this fluid replacement process, in addition to reducing ozone formation does not negatively impact any other desirable performance attributes of the composition as described above.

The flash point of a fluid according to the present invention is preferably at least −6.1° C. or higher, more preferably greater than +6.0° C., even more preferably greater than 15° C., still more preferably greater than 25° C., yet even more preferably greater than 37.8° C., and most preferably greater than 60° C. One of ordinary skill in the art can readily determine the flash point of a fluid or blend (e.g., ASTM D92-78).

In the case of a blend, the flash point of the blend may be the flash point of the more volatile component, in the instance where the flash points of the individual components differ markedly or where the more volatile component is the predominant component. The flash point of the blend may be in between the flash points of the individual components. As used herein, the term "flash point" will refer to the flash point experimentally determined for a single fluid or a blend, as applicable.

The fluid or blend thereof, according to the present invention, should preferably not contribute measurably to particulate formation of particulates having a size diameter below 2.5 $\mu$m—referred to as 2.5PM herein—in the atmosphere. In a preferred embodiment of a process of reducing ozone formation, the fluid selected to replace a previously-used solvent will be one that also reduces particulate matter to less than or equal to 65 $\mu$g/m$^3$, and more preferably less than or equal to 50 $\mu$g/m$^3$, when measured over a 24-hour period, preferably spatially averaged over all monitors in a given geographic area.

The evaporation rate should be suitable for the intended purpose. In many if not most applications, the fluid according to the present invention will be used to replace, at least in part, a fluid which is environmentally disadvantaged, meaning it has a reactivity in ozone formation greater than 1.5 in Absolute MIR units. The fluid selected preferably will have a similar evaporation rate to the disadvantaged fluid being replaced, particularly in the case where a fluid blend is used and an acceptable evaporation profile is desired. It is convenient for the fluid selected to have an evaporation rate less than 12 times the evaporation rate of n-butyl acetate. Evaporation rates may also be given relative to n-butyl acetate at 1.0 (ASTM D3539-87). Ranges of evaporation rates important for different applications are 5–3, 3–2, 2–1, 1.0–0.3, 0.3–0.1, and <0.1, relative to n-butyl acetate at 1.0. The present invention is related to fluids and fluid blends that at least partially evaporate into the atmosphere during or after their application. The use of fluids of the present invention is preferred when >25% of the fluid is evaporated, more preferably when >50% of the fluid is evaporated, more preferably when >80% of the fluid is evaporated, more preferably when >95% of the fluid is evaporated, and most preferably when >99% of the fluid is evaporated. In a preferred embodiment of the present invention wherein, in a method of reducing ozone formation, a fluid according to the present invention replaces, at least in part, another fluid not according to the present invention, the fluid replaced has an evaporative rate ranging from that of MEK (methyl ethyl ketone) to less than that of n-butyl acetate.

The fluid or fluid blend according to the present invention may act in the traditional manner of a solvent by dissolving completely the intended solute or it may act to disperse the solute, or it may act otherwise as a fluid defined above. It is important that the solvency of the fluid be adequate for the intended purpose. In addition to the required solvency, the formulated product must be of a viscosity to enable facile application. Thus, the fluid or fluid blend must have the appropriate viscosities along with other performance attributes. One of ordinary skill in the art, in possession of the present disclosure, can determine appropriate solvent properties, including viscosity.

Toxicity relates to the adverse effect that chemicals have on living organisms. One way to measure the toxic effects of a chemical is to measure the dose-effect relationship; the dose is usually measured in mg of chemical per kg of body mass. This is typically done experimentally by administering the chemical to mice or rats at several doses in the lethal range and plotting the logarithm of the dose versus the percentage of the population killed by the chemical. The dose lethal to 50% of the test population is called the median lethal dose (LD50) and is typically used as a guide for the toxicity of a chemical. See, for instance, Kirk-Othmer Encyclopedia of Chemical Technology, Fourth Edition, Vol. 24, pp. 456–490. Currently an LD50 of >500 mg/kg qualifies as "not classified" for oral toxicity under OSHA rules. EU (European Union) uses a cutoff of >2,000 mg/kg. It is preferred that the fluid or fluid blend according to the present invention have an oral rat LD50 of >500 mg/kg, more preferably >1000 mg/kg, still more preferably >2,000 mg/kg, even more preferably >3,000 mg/kg, and most preferably >5,000 mg/kg. Likewise, the fluid or blend should also cause no toxicity problems by dermal or inhalation routes and should also not be an eye or skin irritant, as measured by OSHA or European Union (EU) standards.

As described above, the present invention is related to fluid solvents and fluid solvent blends which produce reduced ozone formation due to atmospheric photochemical reactions and which avoid the deficiencies associated with halogenated organic compounds, particularly toxicity, ozone depletion, incineration by-products and waste disposal problems. In this aspect, the volatile components of the preferred fluid solvents and fluid solvent blends preferably do not have more than 2.0 wt. % of halogen and more preferably less than 0.5 wt. %, and most preferably less than 0.1 wt. %.

The fluid according to the present invention should be thermally stable so that it does not break down. For instance, the material should not break down into reactive species. In a preferred embodiment, the fluid is more thermally stable than t-butyl acetate.

Inertness, as used herein, refers to the lack of a tendency to undergo decomposition with other materials in the fluid system. It may include, for example, inertness towards acids or bases, but particularly to acid catalysts, which are typically present in coating compositions.

It is preferred that the fluid being replaced have an MIR greater than that of acetone. In another embodiment, the incremental reactivity, based on the MIR scale, of the fluid being replaced is preferably >0.50, still more preferably >0.1.00, and most preferably >1.50.

In another embodiment, it is critical that in a process of reducing tropospheric ozone formation according to the present invention, the fluid replaced have a greater MIR than the fluid added, that is, the fluid according to the present invention. Of course it is to be recognized that only a portion of the higher MIR fluid need be replaced, thus obtaining a blend, in order to achieve the ozone formation reduction.

However, in another embodiment of the present invention, the fluid being replaced may have an acceptable MIR, but be unacceptable with respect to one or more of the aforementioned performance attributes of flash point or flammability, particulate formation, evaporation rate, solvency, toxicity, thermal stability, or inertness. Examples of a given blend of DMC and MEK will be provided wherein the appropriate addition of DMC (or "replacement" of acetone) provided for an improvement in at least one of these attributes.

Examples of fluids which are replaced by fluids according to the present invention include aromatic and aliphatic hydrocarbon fluids such as: branched $C_6$–$C_9$ alkanes, straight chain alkanes, cycloaliphatic $C_6$–$C_{10}$ hydrocarbons, natural hydrocarbons (alpha or beta pinenes, or turpentines, etc.), ethanol, propanol and higher nontertiary alcohols, $C_3$ and higher ethers, ether alcohols, ether alcohol acetates, ethyl ethoxy propionate, $C_5$ and higher ketones, cyclic ketones, etc., $C_7$+aromatic hydrocarbons; halocarbons, particularly chlorinated and brominated hydrocarbons; and ethers such as cyclic ethers such as tetrahydrofuran (THF),. Examples of other common industrial solvents which may be replaced by fluids according to the present invention are those listed in *Kirk-Othmer Encyclopedia of Chemical Technology, Fourth Edition*, Vol. 22, p. 536–548.

Some particularly preferred replacements, i.e., a fluid according to the present invention for a currently used industrial solvent, include: in any application, but particularly coatings applications, DMC or methyl pivalate for toluene, xylene, or t-butyl acetate; methyl isopropyl carbonate (MIPC) for xylene or methyl isobutyl ketone (MIBK); and diisopropyl carbonate (DIPC) for methyl amyl ketone (MAK), propylene glycol monomethyl ether acetate (PMAc), or ethyl ethoxy propionate (EEP); in any application, but particularly consumer product applications DMC, MIPC, or DIPC for hydrocarbons; in any application but particularly agricultural applications, DIPC for aromatic fluids; in any application but particularly cleaning applications, DIPC or methyl sec-butyl carbonate (MSBC) for chlorinated solvents; in any application, but particularly inks, substitute DMC or methyl pivalate for MEK and light acetates.

The fluids and blends according to the present invention may be used in any process using a fluid, and particularly those process wherein at least a portion of the fluid evaporates and even more particularly wherein at least a portion evaporates into the atmosphere. Preferred processes are those utilizing the fluid as one or more of a carrier, diluent, dispersant, solvent, and the like, include processes wherein the fluid functions as an inert reaction medium in which other compounds react; as a heat-transfer fluid removing heat of reaction; to improve workability of a manufacturing process; as a viscosity reducer to thin coatings to application viscosity; as an extraction fluid to separate one material from another by selective dissolution; as a tackifier or to improve adhesion to a substrate for better bonding; as a dissolving medium to prepare solutions of polymers, resins, and other substances; to suspend or disperse pigments and other particulates; and the like.

It is preferred that the process be a stationary process and also preferred that the process be a non-combustion process. It is particularly beneficial if the fluid according to the present invention be used to replace at least a portion of a traditional industrial solvent in a process using a large amount of fluid, e.g., a process using 1000 lb/year (500 kg/year), even more preferably 5 tons/year (5000 kg/yr), still more preferably 50 tons/year (50,000 kg/yr), and most preferably one million lbs/year (500,000 kg/yr). In a preferred embodiment, the process wherein the aforementioned fluid replacement occurs is on the scale of at least pilot plant-scale or greater.

It is also preferred that the process in which a fluid or blend according to the present invention is used or in which at least one fluid according to the present invention replaces, at least partially, a fluid having a higher MIR, be a process in which the fluid is intended to evaporate, such as in a coating process. In such a process were the fluid is intended to evaporate, it is preferred that at least 10% of the fluid or fluids evaporate, more preferably 20% of the fluids, and so on, so that it is most preferable if >99% of the fluid or fluids present in the coating evaporate.

Furthermore, one of the greatest environmental benefits of replacing a currently-used industrial solvent with a solvent according to the present invention will be realized if performed in a geographic area where monitoring for ozone and particulate matter formation occurs, and more particularly in geographic areas defined by a city and its contiguous area populated by at least 500,000 persons, and wherein the replacement of at least a portion of the currently-used industrial solvent with a fluid according to the present invention causes at least one of:

(i) a reduction in the ozone formation, as measured by either monitoring devices or by a calculation of the reduction using the MIR of the industrial solvent replaced and the fluid added according to the present formation; or (ii) a reduction in particulate formation of particles having a diameter less than 2.5 µm (2.5 PM), preferably measured as a 24 hour standard, more preferably wherein that reduction is from greater than 65 µg/m$^3$ to less than that amount in a 24 hour period, still more preferably from greater than 65 µg/m$^3$ to less than or equal to 50 µg/m$^3$ in a 24 hour period;

and more preferably both (i) and (ii).

In another embodiment, there is a method of selecting a fluid for use in a process wherein at least a portion of the fluid eventually evaporates into the atmosphere, comprising selecting as the fluid a blend of:

(a) at least one fluid A having a low MIR, preferably similar to or less than or equal to 1.50, more preferably less than or equal to 1.00, yet still more preferably wherein the MIR is less than or equal to 0.50 and still even more preferably less than or equal to 0.35; and (b) at least one fluid B characterized by having at least one unsuitable attribute selected from: (i) high MIR, preferably measured by the MIR scale, e.g., having an MIR>0.50, more preferably >1.00, and yet even more preferably >1.50; (ii) low flash point, preferably less than or equal to 37.8° C., more preferably less than or equal to 25° C., even more preferably less than or equal to 15° C., yet even more preferably less than or equal to 6.0° C., and most preferably less than −6.1° C.; (iii) formation of 2.5 PM particulates (e.g., wherein said process, using fluid B, produces 2.5 PM greater than 65 micrograms per cubic meter or greater, as measured in a 24-hour period); (iv) toxicity, preferably those having an oral rat LD50 less than or equal to 1,000 mg/kg, and most preferably less than or equal to 500 mg/kg; (vi) thermal stability, preferably having a thermal stability equal to or less than (more unstable) than t-butyl acetate; and (vii) inertness in the fluid or fluid blend, particularly with respect to any acids or bases present in the fluid or blend.

Preferred examples of fluid A include:

dialkyl carbonates, such as dimethyl carbonate (DMC), methyl ethyl carbonate, methyl isopropyl carbonate, methyl sec-butyl carbonate, methyl t-butyl carbonate, methyl neopentyl carbonate, and diisopropyl carbonate;

alkyl acetates, such as neopentyl acetate, ethylene glycol diacetate, 1,2-propylene glycol diacetate, 1,3-propylene glycol diacetate, 1,2-butylene glycol diacetate, 1,3-butylene glycol diacetate, 2,3-butylene glycol diacetate, neopentyl glycol diacetate;

dioxolanes such as 2,2-dimethyl dioxolane, 2,2,4-trimethyl dioxolane, 2,2,4,5-tetra methyl dioxolane;

pivalates (trimethyl acetates) such as methyl pivalate (MP), isopropyl pivalate, t-butyl pivalate (TBP), neopentyl pivalate (NPP), 1,2-propylene glycol bis-pivalate (PGBP), ethylene glycol bis-pivalate, ethylene glycol monopivalate, 1,2-butylene glycol monopivalate (1,2-BGMP), 2,3-butylene glycol monopivalate (2,3-BGMP), 1,2-butylene glycol pivalate acetate (1,2-BGPA), 1,2-butylene glycol pivalate acetate (1,2-BGPA), 2,3-butylene glycol pivalate acetate (2,3-BGPA), ethylene glycol pivalate acetate, 1,2 propylene glycol monopivalate, neopentyl glycol mono pivalate, and 1,2-propylene glycol pivalate acetate;

isobutyrate compounds such as isopropyl isobutyrate, neopentyl isobutyrate, and neopentyl glycol mono isobutyrate; and 2,2,4,4-tetramethyl pentanonitrile (TMPN); isopropyl neononanoate; pivalonitrile; methyl 2,2,4,4-tetramethyl pentanoate (methyl neononanoate); and methyl 3,5,5 trimethyl hexanoate.

Preferred examples of fluid B include aromatic and aliphatic hydrocarbon fluids such as toluene and xylenes; alcohols such as ethanol, n-butyl alcohol, n-propyl alcohol, and sec-butanol; esters such as ethyl ethoxy propionate propylene glycol methyl ether acetate; ketones such as methyl ethyl ketone (MEK), $C_5$–$C_{10}$ linear ketones, cyclic ketones; halocarbons, particularly chlorinated and brominated hydrocarbons; cyclic ethers such as THF, and non-cyclic ethers such as methyl tert-butyl ether (MTBE).

The present invention also concerns mixtures or blends of at least one fluid according to the present invention and fluids which are known to have acceptable low OFP, e.g., acetone (MIR=0.48), methyl acetate (MIR=0.12), tert-butyl acetate (MIR=0.21), tertiary butanol (MIR=0.40), dimethyl succinate (MIR=0.20), dimethyl glutarate (MIR=0.40), and propylene carbonate (MIR=0.43). Such blends can have some important advantages, for example, blends of DMC and MEK, or DMC and methyl acetate, as previously mentioned. These blends are also considered to be part of the present invention. In combination with fluids having an MIR higher than 0.50, the fluids still can provide significant reduction in ozone formation for blended fluid compositions with other important properties for the particular application. Therefore, fluid compositions with low or reduced OFP comprising solvents selected from the list above are important goals of the present invention, even if their weighted OFP is above 0.50 in the MIR scale.

The fluids listed above are recommended to be used in solvent compositions intended for release into air and are required to provide low reactivity in ozone formation. The solvents selected according to the present invention can be used in blends with each other as well as in blends with other solvents (e.g., solvents B, above), different from the solvents of the present invention. When all solvents included in the blend have MIR reactivity~0.50 or less, the solvent blends also will have low atmospheric photochemical reactivity with MIR of about 0.50 and less.

The present inventors have found that many solvent blends can have an MIR in the range of ethane or acetone, even though one component may exceed that range, and therefore in terms of reactivity toward ozone formation behave as exempt solvents. The range of reactivities in exempt solvents allows a selection of fluids with extremely low reactivity, with MIR number in range of ≦0.35 and more suitably ≦0.24. These fluids can be blended not only with fluids with reactivity based on MIR of ~0.50 or less but, with appropriately selected fluids with MIR numbers >0.50 and at certain ratios still form fluid compositions with weighted reactivity about 0.50 or less. These blends can significantly expand the range of properties of solvent compositions and provide formulators with necessary flexibility for different applications. The selection of fluids with MIRs >0.50 can be relatively wide, however, to achieve significant reduction in weighted reactivity to ~0.50 or less, it is recommended to choose solvent with MIR <1.5, suitably <1.2, and more suitably <1.0.

The conception of blends demonstrating MIR of about 0.50 or less can be applied to other solvents with known extremely low reactivities. For example, methyl acetate has an MIR 0.12 but flash point ~−12° C. Thus, methyl acetate can be blended with butyl acetate (MIR=1.00 and flash point 27° C.) in weight ratio of 57:43 forming a blend with MIR=0.50, providing reactivity similar to exempt solvents.

This blend would have a better flash point and lower evaporation rate, making it useful for many applications which methyl acetate could not satisfy due to very low flash point. Butyl acetate which is not an exempt solvent, would become part of a mixture which by its weighted reactivity would behave similar to exempt solvent and, therefore, constitute preferred solvent composition.

This special case of blends comprising at least one solvent with MIR reactivity <0.50 and at least one solvent with MIR >0.50 which have their weighted reactivity about 0.50 or less is one very important part of the present invention. Among known solvents with extremely low MIR, suitable components for the preferred blended solvents are methyl acetate (MIR=0.12), t-butyl acetate (MIR=0.21), dimethyl succinate (MIR=0.20) and methyl siloxanes including cyclomethylsiloxanes. Blends of these solvents with other solvents with MIR >0.50 resulting in weighted MIR of about 0.50 or less for the blend are preferred solvents according to the present invention.

However, some of the most interesting blends are the blends of at least one solvent with MIR reactivity <0.50 and with at least one with MIR reactivity >0.50, which can be generated with the solvents from the list of the present invention.

The present invention offers fluids and fluid blends for use in a variety of industrial applications such as paints and other coatings, adhesives, sealants, agricultural chemicals, cleaning solution, consumer products such as cosmetics, pharmaceuticals, drilling muds, extraction, reaction diluents, inks, metalworking fluids, etc.

Among the most preferred fluids according to the present invention are dimethyl carbonate and methyl pivalate. Table 1 demonstrates the extremely low relative reactivities—significantly lower than both acetone and ethane—of dimethyl carbonate and methyl pivalate. This data shows that these two compounds satisfy the EPA requirements for exempt solvents in accordance with current VOC regulations and demonstrating extremely low reactivity for the possible future reactivity based rules. Additionally, DMC is shown to be one of the lowest reactivity compounds among all currently known oxygenated compounds.

acceptable flash points, boiling temperatures, evaporation rates, low toxicity, good solvency and overall outstanding performance as versatile environmentally preferred exempt, extremely low ozone formation fluids (solvents) for a very wide range of applications.

TABLE 2a

Absolute Reactivity Conversion Ratios

|  |  | ROG | Ethane | Acetone | DMC | MP |
|---|---|---|---|---|---|---|
| Ozone Yield Relative Reactivities | MIR | 1 | 0.09 | 0.12 | 0.02 | 0.06 |
|  | MOIR | 1 | 0.16 | 0.14 | 0.04 | 0.11 |
|  | EBIR | 1 | 0.21 | 0.15 | 0.05 | 0.12 |
| Ozone Yield Absolute Reactivities | MIR | 3.93 | 0.354 | 0.472 | 0.079 | 0.236 |
|  | MOIR | 1.41 | 0.226 | 0.197 | 0.056 | 0.155 |
|  | EBIR | 0.82 | 0.172 | 0.123 | 0.041 | 0.098 |

TABLE 2b

Fluid Solvent Properties

|  |  | Acetone | DMC | MP |
|---|---|---|---|---|
| Boiling Temperature, ° C. | | 56 | 90 | 99 |
| Viscosity (cps, 20° C.) | | 0.33 | 0.60 | 0.74 |
| Specific Gravity | | 0.792 | 1.065 | 0.873 |
| Surface Tension | | 22.3 | 29.0 | 23.8 |
| Flash Point (° C.) | | −20* | +19 to +32* | 27.2 |
| Evaporation Ratio to Butyl Acetate | | 18 | 3.2 | 2.2 |
| Hansen Solubility Parameter | Total | 9.2 | 9.8 | 8.1 |
| | Nonpolar | 7.6 | 7.6 | 7.2 |
| | Polar | 5.1 | 3.6 | 1.8 |
| | H-Bouding | 3.4 | 4.9 | 3.1 |
| Toxicity (LD-50, mg/kg) | | 5800 | 13000 | |

* Reflects Varied Reported Literature Data

Likewise, dimethyl carbonate (DMC) is highly preferable and can be blended with another organic solvent, even one having an Absolute MIR greater than 0.50 to form a solvent system that would still have an Absolute MIR of less than 0.50. DMC blended with another organic solvent would also exhibit other desirable environmental properties because DMC has a relatively high flash point and low toxicity.

TABLE 1

Summary of calculated incremental reactivites (gram basis) for ethane, acetone, dimethyl carbonate, and methyl pivalate, relative to the average of all VOC emissions.

| | Ozone Yield Relative Reactivities | | | | Max. 8 Hour Avg. Relative Reactivities | | | |
|---|---|---|---|---|---|---|---|---|
| Scenario | Ethane | Acetone | DMC | Me-Pvat | Ethane | Acetone | DMC | Me-Pvat |
| Max React | 0.09 | 0.12 | 0.02 | 0.06 | 0.08 | 0.15 | 0.04 | 0.07 |
| Max Ozone | 0.16 | 0.14 | 0.04 | 0.11 | 0.10 | 0.15 | 0.05 | 0.09 |
| Equal Benefit | 0.21 | 0.15 | 0.05 | 0.12 | 0.12 | 0.15 | 0.07 | 0.09 |

Table 2a shows the conversion of a portion of the data in Table 1 into Absolute Maximum Incremental Reactivities for the dimethyl carbonate and methyl pivalate. As seen from Table 2, Absolute Ozone Formation for different levels of $NO_x$ in ROG is highest for highest level of $NO_x$ scenario (MIR) and lowest for lowest level of $NO_x$ scenario (EBIR). As a result, Absolute Reactivity in atmospheric photochemical ozone formation for tested compounds is highest for MIR scenario and lowest for EBIR scenario. This data demonstrates the outstanding value as Low Polluting Potential Fluids (LPPF), Very Low Polluting Potential Fluid (VLPPF), and Negligibly Polluting Potential Fluid (NPPF). Additionally Table 2b shows both compounds as having Again, heretofore unrecognized as a low OFP fluid, the Relative MIR of DMC is calculated to be 0.02, using the SAPRC97 model.

The compounds presented in Tables 3–5 show calculated Absolute MIR reactivities for compounds useful as Low Polluting Potential Fluids (LPPF), Very Low Polluting Potential Fluids (VLPPF), and Negligibly Polluting Potential Fluids (NPPF) or as part of a fluid solvent blend. These fluids provide favorable MIR reactivities, a very wide range of evaporation rates, and a wide range of solvency and compatability with other solvents, polymers, pigments, catalysts, additives, etc., necessary for actual applications. All the compounds listed in the present invention, especially in Tables 2a–5, are very useful as substitute conventional solvents having an Absolute MIR between 1.5 and 3.0 and especially in solvents having high reactivity Absolute MIR greater than 3.0 in atmospheric photochemical ozone formation.

TABLE 3

Calculated Absolute MIR Reactivities For Negligibly Polluting Potential Fluids

| Compound | Absolute MIR (gram ozone produced/gram fluid) |
| --- | --- |
| Dimethyl Carbonate | 0.079 (Actual measured value) |
| Methyl Pivalate | 0.236 (Actual measured value) |
| Methyl Tertiary Butyl Carbonate | 0.246 |
| Tertiary Butyl Pivalate | 0.324 |
| Pivalonitrile | <=0.200 (Expected value) |

TABLE 4

Calculated Absolute MIR Reactivities For Very Low Polluting Potential Fluids

| Compound | Absolute MIR (gram ozone produced/gram fluid) |
| --- | --- |
| Ethylene Glycol Dipivalate | 0.538 |
| Diisopropyl Carbonate | 0.606 |
| Methyl Ethyl Carbonate | 0.649 |
| Ethyl Pivalate | 0.657 |
| Ethylene Glycol Pivalate Acetate | 0.667 |
| 1,2-Propylene Glycol Dipivalate | 0.697 |
| Neopentyl Pivalate | 0.700 |
| Neopentyl Glycol Diacetate | 0.743 |
| Methyl Neopentyl Carbonate | 0.800 |
| 1,3-Propylene Glycol Diacetate | 0.826 |
| Neo Pentyl Isobutyrate | 0.862 |
| Ethylene Glycol Diacetate | 0.870 |
| 1,2-Propylene Glycol Monopivalate | 0.884 |
| 1,2-Propylene Glycol Pivalate Acetate (Mix) | 0.890 |
| 1,2-Butylene Glycol Monopivalate | 0.901 |
| Neopentyl Acetate | 0.908 |
| Methyl Isopropyl Carbonate | 0.918 |
| Isopropyl Isobutyrate | 0.930 |
| 1,2-Butylene Glycol Pivalate Acetate (Mix) | 0.934 |
| 2,3-Butylene Glycol Monopivalate | 0.930 |
| 2,3-Butylene Glycol Pivalate Acetate | 0.960 |
| Isopropyl Pivalate | 0.971 |

TABLE 5

Calculated Absolute MIR Reactivity For Low Polluting Potential Solvents

| Compound | Absolute MIR (gram ozone produced/gram fluid) |
| --- | --- |
| NeoPentyl Glycol Monopivalate | 1.062 |
| 1,2-Propylene Glycol Diacetate | 1.196 |
| 1,2-Butylene Glycol Diacetate | 1.254 |
| Methyl Secondary Butyl Carbonate | 1.278 |
| Methyl 3,5,5 Trimethyl Hexanoate | 1.322 |
| 2,3-Butylene Glycol Diacetate | 1.332 |
| Ethylene Glycol Mono Pivalate | 1.365 |
| 1,3-Butylene Glycol Diacetate | 1.373 |

It should be noted that calculated values for the Absolute and the Relative MIR reactivity for DMC and MP were very close to the actual laboratory determined values.

The most preferred use of the fluids according to the present invention is with any process wherein the reduction of ozone formation is desired, and more particularly in consumer products, and coatings such as auto refinishing, architectural and industrial coatings and paints.

Paints and coatings comprise the largest single category of traditional solvent consumption, accounting for nearly half the solvents used. Fluids serve multiple functions in paints and coatings, including solubility, wetting, viscosity reduction, adhesion promotion, and gloss enhancement. Fluids dissolve the resins, dyes and pigments used in the coating formulations. Also, prior to application, it is common practice to add solvent thinner to attain the desired viscosity for the particular application. Solvents begin to evaporate as soon as the coating materials are applied. As the solvent evaporates, film formation occurs and a continuous, compact film develops. Single solvents are sometimes used in coatings formulations, but most formulations are blends of several solvents. In many coatings applications, the solvent system includes a slow-evaporating active solvent that remains in the film for an extended period to enhance the film's gloss and smoothness. Because of evaporation and the large amounts of solvents used in coatings, there is a significant amount of VOC emissions into the atmosphere.

Resins which may be incorporated into compositions comprising fluids according to the present invention include acrylic, alkyd, polyester, epoxy, silicone, cellulosic and derivatives thereof (e.g., nitrocellulosic and cellulosic esters), PVC, and isocyanate-based resins. Numerous pigments may also be incorporated into compositions according to the present invention, and it is within the skill of the ordinary artisan to determine proper selection of the resin and pigment, depending on the end use of the coating.

One of the cleaning applications is cold solvent cleaning which is used to degrease metal parts and other objects in many operations. Mineral spirits have been popular in cold cleaning, but are being supplanted by higher flash point hydrocarbon solvents due to emissions and flammability concerns. Efforts to eliminate organic solvents entirely from cleaning compositions have not been successful because aqueous cleaners do not have the performance properties that make organic solvent based cleaners so desirable. This invention allows formulators the option to seek the use of solvents with very low reactivity as environmentally preferred products meeting environmental concerns and customer performance concerns.

A cleaning solution application which uses evaporation to clean is called vapor degreasing. In vapor degreasing, the solvents vaporize and the cold part is suspended in the vapor stream. The solvent condenses on the part, and the liquid dissolves and flushes dirt, grease, and other contaminants off the surface. The part remains in the vapor until it is heated to the vapor temperature. Drying is almost immediate when the part is removed and solvent residues are not a problem. The most common solvent used in vapor degreasing operations has been 1,1,1-trichloroethane. However, since 1,1,1-trichloroethane is being phased out due to ozone depletion in the stratosphere, alternatives are needed. Moreover, chlorine-based solvents have toxicity concerns. Thus, some of the low reactivity, high flash point solvents in this invention can be used in place of 1,1,1-trichloroethane and other halogenated solvents.

An application that is similar to coatings is printing inks. In printing inks, the resin is dissolved in the solvent to produce the ink. Most printing operations use fast evaporating solvents for best production speeds, but the currently used solvents are highly reactive. Some of the previously described fast evaporation, high flash point, low reactivity in ozone formation fluids according to the present invention are suitable for printing inks.

An application that is suitable to the low toxicity, high flash point and low reactivity in ozone formation fluids according to the present invention is agricultural products. Pesticides are frequently applied as emulsifiable concentrates. The active insecticide or herbicide is dissolved in a hydrocarbon solvent which also contains an emulsifier. Hydrocarbon solvent selection is critical for this application. It can seriously impact the efficiency of the formulation. The solvent should have adequate solvency for the pesticide, promote good dispersion when diluted with water, have low toxicity and a flash point high enough to minimize flammability hazards.

Extraction processes, used for separating one substance from another, are commonly employed in the pharmaceutical and food processing industries. Oilseed extraction is a widely used extraction process. Extraction-grade hexane is a common solvent used to extract oil from soybeans, cottonseed, corn, peanuts, and other oil seeds to produce edible oils and meal used for animal feed supplements. Low toxicity, high flash point, low MIR fluids and fluid blends of the present invention can be useful in such industries.

In addition to the above-mentioned applications, other applications that can use high flash point, low toxicity, low reactivity in ozone formation fluids are adhesives, sealants, cosmetics, drilling muds, reaction diluents, metal working fluids, and consumer products, such as pharmaceuticals or cosmetics.

The invention is further described in the following examples, which are intended to be illustrative and not limiting. One of skill in the art will recognize that numerous variations are possible within the scope of the appendaged claims.

Examples of Fluid Blends Having Negligible Reactivity

Tables A and B below demonstrate fluid solvent blends may be created using (a) negligibly low reactivity fluid solvents and (b) low to very low reactivity fluid solvent in ratios which provide Weight Average MIR reactivity for the total solvent blend of <0.45 and therefore providing ozone formation similar to individual fluid solvents with negligibly low reactivity in atmospheric ozone formation. However, the blends shown in Tables A and B possess characteristics such as better evaporation profiles, flash points, as compared to the individual fluids.

Table A demonstrates negligibly reactive blends based on a known negligibly reactive solvent—methyl acetate and other very low reactivity fluids previously known and from the present invention. In Table A the column with methyl acetate shows the minimum methyl acetate content that will provide negligible reactivity to the blend. As shown, all blends with increased methyl acetate content will result in reduced reactivity in ozone formation.

However, a main interest in blends with reduced methyl acetate content that maintain negligible reactivity is in an increased flash point of the blend. As seen from Table A, especially advantageous are the two blends with the very low reactivity fluid solvents from the present invention, diisopropyl carbonate and ethyl pivalate which require the lowest levels of methyl acetate. This concept of blending the negligible reactivity compounds with low and very low reactivity secondary fluids that can provide Weight Average MIR less than 0.5 is also subject of this invention.

Although it is not necessary that every component of the blend be selected from the list of compounds of the present invention, it should be noted that components selected from the list of the present invention provide especially desireable attributes to a finished solvent blend with reduced or negligible reactivity in atmospheric photochemical ozone formation.

Advantages of the blends created with at least one compound of the present invention is further demonstrated in Table B which utilizes blends with DMC as the negligible reactivity component. DMC allows a high level of the use of the second fluid while maintaining a low MIR while still providing a fluid solvent with an increased flash point from the second fluid by itself. The flash points of each of the composition blends in Table B are >+6° C. and the majority of them have flash points >+15° C.

TABLE A

Selected Blends of Methyl Acetate with Other Very Low Reactivity Solvents at Absolute MIR = 0.45

| Very Low Reactivity Solvent (Second Fluid) | Absolute MIR of Second Fluid Solvent | Weight % of Second Fluid Solvent in Blend with Absolute MIR = 0.45 | Weight % of Methyl Acetate in Blend with Absolute MIR = 0.45 |
| --- | --- | --- | --- |
| Decane | 0.93 | 40.7 | 59.3 |
| Undecane | 0.82 | 47.1 | 52.9 |
| Dodecane | 0.72 | 55.0 | 45.0 |
| Tridecane | 0.66 | 61.1 | 38.9 |
| Ethyl Propianate | 0.86 | 44.6 | 55.4 |
| Isobutyl Isobutyrate | 0.86 | 44.6 | 55.4 |
| Diacetone Alcohol | 0.96 | 39.3 | 60.7 |
| Diisopropyl Carbonate* | 0.606 | 67.9 | 32.1 |
| Ethyl Pivalate* | 0.657 | 61.5 | 38.5 |

*Compounds of the present invention

TABLE B

Selected Blends of DMC* with Other Low or Very Low Reactivity Solvents at Absolute MIR = 0.45 With Flash Points > +6° C.

| Low or Very Low Reactivity Solvent (Second Fluid) | Absolute MIR of Second Fluid Solvent | Weight % of Second Fluid Solvent in Blend with Absolute MIR = 0.45 | Weight % of DMC in Blend with Absolute MIR = 0.45 |
| --- | --- | --- | --- |
| Methyl Ethyl Ketone | 1.32 | 29.9 | 70.1 |
| Isopropanol | 0.81 | 50.8 | 49.2 |
| Decane | 0.93 | 43.6 | 56.4 |
| Butyl Acetate | 1.14 | 35.0 | 65.0 |
| Isopropyl Isobutyrate | 0.86 | 47.5 | 52.5 |
| Diisopropyl Carbonate* | 0.606 | 70.4 | 29.6 |
| Ethyl Pivalate* | 0.657 | 64.2 | 35.8 |

EXAMPLE 1

A representative solvent/resin system was chosen to evaluate the sensitivity of a system to solvent changes and evaporation rate differences. Sequential changes to the solvent system were made, and the impact on resin solubility and evaporation rate profile was determined.

The initial system consisted of 30 wt % Acryloid B-66 resin (an acrylic resin available from Rohm & Haas) in a fluid mixture comprised of 40 wt % MEK (methyl ethyl ketone), 40 wt % MIBK (methyl isobutyl ketone), and 20 wt % Exxate® 600 (a $C_6$ alkyl acetate available from Exxon Chemical Company). DMC was substituted in increments for MIBK, while keeping the rest of the system constant. For example, a solvent blend of 40 wt % MEK, 35 wt % MIBK, 5 wt % DMC and 20 wt % Exxate® 600 was evaluated, and so on until the final solvent blend consisted of 40 wt % MEK, 0 wt % MIBK, 40 wt % DMC and 20 wt % Exxate® 600. This same procedure was repeated substituting DMC for MEK, methyl pivalate for MIBK, and methyl pivalate for MEK, while keeping the rest of the solvent system the same. Ultimately, a solvent blend in which both the MEK and MIBK were replaced by DMC (i.e., 80 wt % DMC and 20 wt % Exxate® 600) and in which both MEK and MIBK were replaced by methyl pivalate (i.e., 80 wt % methyl pivalate and 20 wt % Exxate® 600) was considered. Evaporation profiles were compared for each solvent blend.

The time required to evaporate 10, 50, and 90 wt % of the fluid was calculated using CO-ACTsM computer program (see, for instance, Dante et al., *Modem Paint and Coatings*, September, 1989). The results are shown below in Table 6.

TABLE 6

| Wt % in fluid (w/20 wt % Exxate ® 600) | Evaporation (minutes) | | | MIR Reduction |
|---|---|---|---|---|
| | 10% | 50% | 90% | |
| 40 MEK/40 MIBK | 0.7 | 4.9 | 46 | (comparative) |
| 40 MEK/0 MIBK/40 DMC | 0.5 | 3.8 | 48 | 70% |
| 0 MEK/40 MIBK/40 DMC | 1.0 | 6.9 | 50 | 19% |
| 0 MEK/0 MIBK/80 DMC | 0.8 | 5.4 | 55 | 89% |
| 40 MEK/0 MIBK/40 MP | 0.5 | 3.5 | 44 | 68% |
| 0 MEK[4]0 MIBK/40 MP | 0.9 | 6.3 | 48 | 17% |

The reduction in MIR is calculated using the known values of 1.34 for MEK, 4.68 for MIBK, and determined values of 0.079 for DMC and 0.236 for methyl pivalate (MP).

These results show that there is very little difference in the evaporation profiles between a known resin/solvent system and a resin/solvent system using the fluids according to the present invention. Moreover, the above results show the advantage of the process according to the present invention of reducing ozone formation by replacing at least a portion of a fluid not having a low ozone formation potential (MIR≧0.50) with a solvent exhibiting a low reactivity in ozone formation.

COMPARATIVE EXAMPLE 1

The above experiment was repeated using fluids known to have low reactivity in ozone formation, methyl acetate (MeOAc, MIR=0.12) and t-butyl acetate (t-BuOAc, MIR=0.21). The results are shown below.

TABLE 7

| Wt % in fluid (w/20 wt % Exxate ® 600) | Evaporation (minutes) | | | MIR Reduction |
|---|---|---|---|---|
| | 10% | 50% | 90% | |
| 40 MEK/40 MIBK | 0.7 | 4.9 | 46 | (comparative) |
| 40 MEK/ 0 MIBK/40 MeOAc | 0.2 | 1.6 | 44 | 69% |
| 0 MEK/40 MIBK/40 MeOAc | 0.2 | 2.9 | 47 | 19% |
| 40 MEK/ 0 MIBK/40 t-BuOAc | 0.5 | 3.5 | 44 | 68% |
| 0 MEK/40 MIBK/40 t-BuOAc | 0.9 | 6.2 | 48 | 17% |

The results do show a marked effect in the evaporation profile when MeOAc is substituted for MEK or MIBK, and thus this known low OFP fluid would not be a good substitute for currently-used coating fluids. While t-BuOAc shows a similar profile to DMC and MP, as discussed above t-BuOAc is thermally unstable, and is not inert with respect to acids, as shown below.

EXAMPLE 2

Acrylic solvent systems were prepared to test the stability of dimethyl carbonate to acid catalysts, which are commonly present in coating compositions. The formulations contained 29.9 wt % DMC, 28.7 wt % pentyl acetate, 20.2 wt % n-butyl acetate, 16.1 wt % n-butyl alcohol, 3.6 wt % methyl ethyl ketone, 1.5 wt % isopropyl alcohol. 2 wt % toluene as an internal standard. The latter materials were purchased from Aldrich Chemical Co.

Para toluene sulfonic acid (PTSA) was added to the above formulation (again, pTSA was purchased from Aldrich Chemical Co.), in the amount of 0.5 wt %. The solutions were sealed and placed in an oven at 50° C. under a nitrogen atmosphere. Samples were withdrawn at intervals for testing. The content of dimethyl carbonate was monitored over time by gas chromatographic analysis using an HP 5890 gas chromatograph. In a parallel experiment an equal amount of tert. Butyl acetate was used instead of DMC. The results are shown below in Table 8 (all percentaages are by weight)

TABLE 3

| Solvent | Wt. % of Solvent At Start of Test | Wt. % of Solvent At One Week Decomposition Period | Wt. % of Solvent At Three Week Decomposition Period |
|---|---|---|---|
| DMC wt. % | 100 | 97.8 | 95.4 |
| Tert Butyl Acetate* | 100 | 54.4 | 17.2 |

*decomposes to isobutylene (48.3 wt. %) and acetic acid (51.7 wt. %)

It is interesting to note that the decomposition products of tert butyl acetate, isobutylene and acetic acid, have MIRs of 6.81 and 0.67 respectively. This results in a weight average reactivity of the decomposition products of tert. butyl acetate to be 3.64 grams of ozone produced per gram of decomposition products versus 0.21 per tert butyl acetate. Such decomposition products. would not be considered negligible or low reactivity compounds.

The above results clearly show that dimethyl carbonate is more stable to acid catalysts than is t-butyl acetate. Thus, a coating formulation containing dimethyl carbonate as a fluid would be expected to be more storage stable than one containing t-butyl acetate. Storage stability is an important attribute in a coating composition, e.g., a paint.

EXAMPLE 3 (COMPARATIVE)

A typical acrylic-based coating system was prepared using a Gloss White Electrostatic Spray Topcoat, formulation MKY-504-1 developed and recommended by S. C. Johnson Polymer as follows:

| Johcryl 504 | 410.62 gr. (80% conc. [001b]in xylene) |
|---|---|
| Cymel ™ 303 | 140.94 gr. |
| TiO$_2$ (TiPure R-960) | 360.68 gr. |
| Byk P-1049 | 2.22 gr. |
| 10% DC-57 in MAK | 11.10 gr. |
| Nacure 2500 | 5.55 gr. |
| Amyl Acetate | 78.8 gr. |
| Butyl Acetate | 55.49 gr. |
| N-Butanol | 44.39 gr. |

This Composition had the following formula constraints:

| | | |
|---|---|---|
| Viscosity (Ford #4) | 44 | seconds |
| PVC | 10.2% | |
| Weight Solids | 75% | |
| Resistivity | 0.7 | megaohms |
| VOC | 2.78 | lb./gal. |
| P/B Ratio | 0.76 | |
| Volume Solids | 61.7% | |
| Catalyst Level | 0.3% | on TRS |

The total solvent composition of the formulation was as follows:

| | |
|---|---|
| Xylene | 29.9 wt. % |
| Amyl Acetate | 28.7 wt. % |
| Butyl Acetate | 20.2 wt. % |
| N-Butanol | 16.1 wt. % |
| MAK | 3.6 wt. % |
| IPA | 1.5 wt. % |

Additional data was calculated for the formulation:

| | |
|---|---|
| Surface Tension .25° C. | 27.12 dyn/cm |
| Flash Point: Deg. C. | 19.5 (Deg. F. 67.1) |

The calculated Evaporation Profile for the formulation characterized in minutes for portions of solvents as it evaporates was as follows:

| | 10% | 50% | 80% | 90% |
|---|---|---|---|---|
| Time (min.) | 4.7 | 33 | 90 | 160 |

This composition was a base to demonstrate how substitution of different component of solvent composition would effect VOC, ozone formation, flash point, and evaporation profile. To calculate ozone formation (in lbs. of ozone per gallon of solid coatings), the following Absolute MIR values from published sources referenced above and our data for the solvents suggested in the present invention were used:

| Component | Absolute MIR |
|---|---|
| Xylene | 7.81 |
| N-Butyl Alcohol | 3.53 |
| N-Butyl Acetate | 1.14 |
| Amyl Acetate | 1.16 |
| Isopropyl Alcohol (IPA) | 0.81 |
| Methyl Amyl Ketone (MAK) | 2.65 |

Wt. Average Absolute MIR for the solvent composition above was calculated to be 3.57 lbs. ozone per lb. of solvent composition, or, multiplying by VOC=2.78 lb./gal. equates to 9.935 lbs. of ozone per gal. of paint.

EXAMPLE 3a

Using the same control formulation as in Example 3 above, dimethyl carbonate was substituted for the xylene in the formulation. The replacement solvent composition was as follows:

| | |
|---|---|
| DMC | 29.9 wt. % |
| Amyl Acetate | 28.7 wt. % |
| Butyl Acetate | 20.2 wt. % |
| N-Butanol | 16.1 wt. % |
| MAK | 3.6 wt. % |
| IPA | 1.5 wt. % |

As a Negligibly Polluting Potential Fluid solvent, DMC can be removed from VOC, providing 29.9% VOC reduction calculated to be 1.95 lb/gal—a very strong VOC reduction which would be difficult to achieve by conventional reformulation.

The surface tension, flash point, and evaporation profile were calculated to be:

| | | | | |
|---|---|---|---|---|
| Surface Tension | 27.71 dyn/cm | | | |
| Flash Point: Deg. C. | 23.2 (Deg. F. 73.8) | | | |
| Evaporation Profile: | 10% | 50% | 80% | 90% |
| Time (min.) | 3.8 | 29 | 100 | 190 |

As seen from the data, the substitution of xylene with DMC did not alter the Evaporation Profile significantly and improved (by raising) the Flash Point. Applying to the solvent composition, the Absolute MIR reactivity from Table 2b Absolute MIR DMC=0.079, the Wt. Avg. MIR reactivity for the solvent composition was calculated to be 1.245, or, multiplying by VOC=2.78 lb./gal. equates to 3.52 lbs. of ozone per gal. of solid coating.

This represents a 65% reduction in ozone formation as compared with control composition.

The data demonstrates that the reactivity approach with the use of solvents suggested in the present invention provide possibility to achieve tremendous reduction in ozone formation, incomparably stronger than would be expected from the simple VOC reduction and without any negative effect on the properties of the coating composition.

EXAMPLE 3b

Using the same control formulation as in Example 3 above, methyl pivalate (MP) was substituted for the xylene in the formulation. The replacement solvent composition was as follows:

| | |
|---|---|
| MP | 29.9 wt. % |
| Amyl Acetate | 28.7 wt. % |
| Butyl Acetate | 20.2 wt. % |
| N-Butanol | 16.1 wt. % |
| MAK | 3.6 wt. % |
| IPA | 1.5 wt. % |

The Negligibly Polluting Potential Fluid solvent MP can be removed from VOC, providing 29.9% VOC reduction to VOC=1.95 lb/gal.—a very strong VOC reduction which would be difficult to achieve by conventional reformulation.

The surface tension, flash point, and evaporation profile were calculated to be:

| Surface Tension | 26 dyn/cm | | | |
|---|---|---|---|---|
| Flash Point Deg. C. | 19.7 (Deg. F. 67.5) | | | |
| Evaporation Profile: | 10% | 50% | 80% | 90% |
| Time (min.) | 3.3 | 26 | 90 | 175 |

As seen from the data, substitution of xylene with MP did not alter the Evaporation Profile significantly or cause any negative effect on the properties of the composition.

Using the Absolute MIR reactivity from Table 2a, the Wt. Avg. MIR reactivity was calculated for the solvent composition to be 1.312. Multiplying the MIR by the VOC of 2.78 lb/gal, it is calculated to be 3.65 lbs. of ozone per gal. of solid coating or 63.3% reduction in ozone formation as compared with control composition.

These examples demonstrate that both the compounds suggested by the present invention unexpectedly provided not only a very significant reduction in VOC in a typical coating formulation, but also provided incomparably stronger reduction in ozone formation potential. These very strong positive effects were achieved without any negative effect on the coating compositions.

The value of Low Polluting Potential Fluids (LPPF), Very Low Polluting Potential Fluids (VLPPF), and especially Negligibly Polluting Potential Fluids (NPPF) of the present invention provide the opportunity for further strong reduction in ozone formation that can be achieved even without a VOC reduction from the fluid solvent compositions.

The following examples demonstrate how Very Low Polluting Potential Fluids (VLPPF) of the present invention can provide significant additional reduction in ozone formation even without any change in the VOC value of the compositions. A significant reduction in ozone formation can be provided by the use of diisopropyl carbonate—one of Very Low Polluting Potential Fluids suggested in the present invention which provide medium to low evaporation rate, and, therefore, is an acceptable substitute for higher Absolute MIR value conventional oxygenated solvents with a boiling temperature of 135° C.–160° C.

EXAMPLE 3c

Using the same control formulation as in Example 3 above, the replacement solvent composition substituted DMC for the xylene, DIPC for the MAK, and a partial substitution of Amyl Acetate with DIPC.

| Solvent Composition: | |
|---|---|
| DMC | 29.9 wt. % |
| DIPC | 23.8 wt. % |
| Amyl Acetate | 8.5 wt. % |
| Butyl Acetate | 20.2 wt. % |
| N-Butanol | 16.1 wt. % |
| IPA | 1.5 wt. % |

This composition can provide the same strong VOC reduction as in Example 3a (VOC=1.95 lb/gal instead of 2.78 lb/gal).

The surface tension, flash point, and evaporation profile were calculated to be:

| Surface Tension | 28.69 dyn/cm | | | |
|---|---|---|---|---|
| Flash Point: Deg. C. | 39.9 (Deg. F. 103.8) | | | |
| Evaporation Profile: | 10% | 50% | 80% | 90% |
| Time (min.) | 4.0 | 30 | 105 | 205 |

The data demonstrates an insignificant change in the Evaporation Profile and no negative effects on the properties of the composition.

Applying this solvent composition, the Absolute MIR reactivities from the above referenced materials given above, we find Wt. Avg. Absolute MIR for the solvent composition=1.0785, or, multiplying by the VOC=2.78 lb/gal we find 2.998 lbs. of ozone per gal. of coating.

This would represent 69.8% reduction in ozone formation as compared with control composition. This additional reduction of ozone formation is actually achieved at the same VOC and demonstrates the potential to achieve significant ozone reduction within the same level of VOC and without any negative effect on coating composition properties.

EXAMPLE 3d

Using the same control formulation as in Example 3 above, the replacement solvent composition substituted MP for the xylene, DIPC for the MAK, and a partial substitution of Amyl Acetate with DIPC.

| Solvent Composition: | |
|---|---|
| MP | 29.9 wt. % |
| DIPC | 23.8 wt. % |
| Amyl Acetate | 8.5 wt. % |
| Butyl Acetate | 20.2 wt. % |
| N-Butanol | 16.1 wt. % |
| IPA | 1.5 wt. % |

The VOC reduction for the composition would be the same as in Examples 3a–3c to 1.95.

The surface tension, flash point, and evaporation profile were calculated to be:

| Surface Tension | 27.16 dyn/cm | | | |
|---|---|---|---|---|
| Flash Point: Deg. C. | 35.5 (Deg. F. 95.9) | | | |
| Evaporation Profile: | 10% | 50% | 80% | 90% |
| Time (min.) | 4.0 | 32 | 100 | 195 |

The data demonstrates insignificant change in the Evaporation Profile and no negative effects on the properties of the composition.

Applying to the solvent composition the Absolute MIR reactivity as Wt. Avg. Absolute MIR for the solvent composition of 1.125, or, multiplying by the VOC=2.78 lb/gal results in an MIR value of 3.23 lbs. of ozone per gal. of coating, or 67.5% reduction in ozone formation as compared with control composition. Comparing this with Example 3c, 63.3% reduction in ozone formation, we observe a significant reduction at the same VOC.

Examples 3c and 3d demonstrate important opportunities to reduce ozone formation through the substitution of high reactivity conventional components of the solvent (fluid) composition exclusively with the Negligibly Polluting Potential and Very Low Polluting Potential fluids from the present invention.

However, an important objective of the present invention is the combinations with other known Low Polluting Potential or Very Low Polluting Potential fluid solvents with Negligibly Polluting Potential, Very Low Polluting Potential, or Low Polluting Potential fluid solvents of the present invention.

These combinations can provide the additional reduction in ozone formation potential unattainable by a currently known technology.

Analyses of the compositions of Examples 3c and 3d shows that these contain N-Butanol with Absolute MIR= 3.53.

This alcohol is necessary to provide storage stability of the compositions containing hexamethoxymethylmelamine (HMMM) crosslinking agents (Cymel™303) and acid (or blocked acid) catalysts. This material cannot be effectively substituted with a non-hydroxyl bearing solvent.

To provide further reduction in ozone formation for the solvent compositions comprising $C_4$ and higher alcohols and ether alcohols, the alcohol functional components can be substituted with methanol and or isopropanol. These hydroxyl functional components have very low reactivity in atmospheric photochemical ozone formation. Due to the toxicity concerns regarding methanol, the preferred choice is isopropanol. The quantity of the alcohols can vary and needs to be optimized for specific formulations, however, mole per mole ratio can be used as a starting point for optimization.

The following Examples 3e and 3f, demonstrate the effectiveness of the combinations to achieve a very high reduction in ozone formation by the combinations of the present invention.

EXAMPLE 3e

Using the same control formulation as in Example 3 above, the replacement solvent composition substituted DMC for the xylene, DIPC for the MAK, a partial substitution of Amyl Acetate with DIPC, and IPA for the N-Butanol.

| Solvent Composition: | |
|---|---|
| DMC | 29.9 wt. % |
| DIPC | 23.8 wt. % |
| Amyl Acetate | 11.5 wt. % |
| Butyl Acetate | 20.2 wt. % |
| IPA | 14.6 wt. % |

In selection of different components, 1:1 mole ratio of N-Butanol was substituted with the isopropanol. The weight reduction due to lower molecular weight of IPA versus N-Butanol was compensated by increasing in amyl acetate to compensate for the initial increase in evaporation rate. As in all examples of the series, the VOC is reduced from 2.78 lb/gal. to 1.95 lb/gal.

The surface tension, flash point, and evaporation profile were calculated to be:

| Surface Tension | 28.73 dyn/cm | | | |
|---|---|---|---|---|
| Flash Point: Deg. C. | 38.4 (Deg. F. 101.1) | | | |
| Evaporation Profile: | 10% | 50% | 80% | 90% |
| Time (min.) | 2.6 | 25 | 112 | 215 |

The data demonstrates insignificant change in the Evaporation Profile and no negative effects on the properties of the composition.

The Wt. Avg. Absolute MIR for the solvent composition is 0.650, or, multiplying by the VOC=2.78, we find 1.81 lbs. of ozone per gal. of coating. This represents an 81.2% reduction in ozone formation as compared with control composition.

Comparing Examples 3a, 3c, 3e, shows how proper selection of the components of the fluid (solvent) composition can provide a very strong reduction in VOC for the overall solvent compositions. Even more important, the examples demonstrate tremendous difference in ozone formation potential even at the same VOC.

EXAMPLE 3f

Using the same control formulation as in Example 3 above, the replacement solvent composition substituted MP for the xylene, DIPC for the MAK, a partial substitution of Amyl Acetate with DIPC, and IPA for the N-Butanol.

| Solvent Composition: | |
|---|---|
| MP | 29.9 wt. % |
| DIPC | 23.8 wt. % |
| Amyl Acetate | 11.5 wt. % |
| Butyl Acetate | 20.2 wt. % |
| IPA | 14.6 wt. % |

The VOC for the composition is 1.95.

The surface tension, flash point, and evaporation profile were calculated to be:

| Surface Tension | 27.02 dyn/cm | | | |
|---|---|---|---|---|
| Flash Point: Deg. C. | 34.1 (Deg. F. 93.4) | | | |
| Evaporation Profile: | 10% | 50% | 80% | 90% |
| Time (min.) | 2.3 | 22 | 100 | 195 |

The data also demonstrates acceptable Evaporation Profile and overall good properties for the coating composition. The WtAv AMIR for the composition is 0.697 or 0.697× 2.78=1.938 lbs. of ozone per gal. of paint. This would represent 80.5% reduction in ozone formation as compared with control composition.

EXAMPLE 3g

Using the same control formulation as in Example 3 above, the replacement solvent composition substituted acetone, a solvent having an MIR similar to the Negligibly Polluting Potential Fluids of the present invention, for the xylene.

Solvent Composition:

| Acetone | 29.9 wt. % |
|---|---|
| Amyl Acetate | 28.7 wt. % |
| Butyl Acetate | 20.2 wt. % |
| N-Butanol | 16.1 wt. % |
| MAK | 3.6 wt. % |
| IPA | 1.5 wt. % |

The surface tension, flash point, and evaporation profile were calculated to be:

| Surface Tension | 25.76 dyn/cm | | | |
|---|---|---|---|---|
| Flash Point: Deg. C. | 11.1 (Deg. F. 52.0) | | | |
| Evaporation Profile: | 10% | 50% | 80% | 90% |
| Time (min.) | 1.1 | 18 | 83 | 164 |

The data demonstrates an unacceptable flash point reduction and a very fast evaporation rate, up to 50% of evaporation, which makes the solvent composition unacceptable for commercial applications. The VOC of the coating composition is 1.95 lb/gal., which is the same as Examples 3a–3f, but the flash point and evaporation rate prevent the use of the acetone as an acceptable Negligibly Polluting Potential Fluid of the present invention in an industrial application.

EXAMPLE 4

A cold-cleaning solvent comprising about 10–60 wt % fluorocarbon, about 1–30 wt % of a chlorinated solvent, and about 10–40 wt % of an oxygenated organic solvent is disclosed in U.S. Pat. No. 5,552,080. The oxygenated organic solvent is preferably n-butanol or isopropanol, but may be also selected from numerous other oxygenated organic fluids, including DMC.

The present inventors have surprisingly discovered that fluids from to the present invention may be used in the aforementioned cleaning composition to reduce tropospheric ozone formation, which is the opposite phenomenon from ozone depletion. This is completely unexpected.

Moreover, contrary to the disclosure by the inventors of the above-mentioned patent, DMC is superior to any of the solvents listed, in terms of reduced ozone formation. That is, replacing n-butanol (MIR=3.6) entirely with DMC (MIR=0.079) results in a huge decrease in the overall weighted average of the blend. Likewise, the present invention also contemplate a blend of, for instance, 50/50 n-butanol/DMC or 50/50 n-butanol/MP, along with the halocarbons, as a cold cleaning solvent useful in reducing ground-based ozone formation. This is a second unexpected result provided by the present invention. Similar results can be expected using methyl pivalate and the other fluids according to the present invention, without a loss of cleaning efficacy. The inventors of the present invention have discovered that blends of dimethyl carbonate and methyl pivalate in a wide range of concentrations can be used as a cold-cleaning solvent composition. The ratios of DMC to MP from 9:1 to 1:9 would allow for a wide range of Negligibly Polluting Potential Fluid solvents with acceptable application properties. These compositions could therefore provide the base for non VOC cleaning fluids without halogenated components and with reasonably high flash points (around 20–25° C.). Other solvents could certainly be incorporated into these compositions allowing for the modification of the evaporation profile as desired, referably from a Low Polluting Potential Fluid, a Very Low Polluting Potential Fluid, or a Negligibly Polluting Potential Fluid of the present inventions.

EXAMPLE 5

The delivery of seed coatings including insecticides and other pesticides, and agents attenuating the growth of plants (e.g., hormones) is extremely valuable to the agricultural industry. In addition to traditional coating techniques, the OSIT method (Organic Solvent Infusion Technique) has been studied and may be useful in the germination of hard coated seeds. In this method, the seed is soaked in the solvent for a fixed amount of time. The solvents are generally highly volatile solvents such as xylene, acetone, methylene chloride ($CH_2Cl_2$). This technique has also been studied in the context of translocation experiments for the production of transgenic crops.

The substitution of DMC and MP for MEK results in a similar evaporation profile, while greatly reducing the MIR of the fluid used, in the case of xylene (p-xylene has the lowest MIR of the xylenes, at MIR=4.40) and acetone (MIR=0.48), and having a reduced toxicity in the case of $CH_2Cl_2$ (MIR=0.10). The examples presented herein demonstrate several beneficial aspects of the inventions:

(a) Fluids with negligibly low MIR reactivity values (<0.5 gr ozone produced/gr solvent fluid used) can be produced using specific chemical compounds (as it demonstrated in literature and in the present invention) and by proper blending with extremely low MIR reactivity organic compounds, preferably methyl acetate and, especially DMC. The blends not only significantly expand the range of negligibly reactive compounds, but also expand the range of properties, and, especially, evaporation profile, which is always significantly wider for blends, than for individual compounds. This is a principal advantage of blends that are deemed Negligibly Polluting Potential Fluids.

(b) The use of Negligibly Polluting Potential Fluids of the present invention provide potential for very significant VOC reduction of the typical solvent compositions. However, reduction of ozone formation with the substitution a part of any solvent with the Negligibly Polluting Potential Fluids of the present invention is disproportionately greater than VOC reduction (~65% versus ~30%). The data demonstrate that VOC is a very poor indicator of ozone formation and can provide misleading data concerning actual ozone formation.

(c) The use of Negligibly Polluting Potential Fluids or any exempt solvents, even with highly beneficial compounds of the present invention provides significant, but still limited reduction in ozone formation.

Further, the use of Low Polluting Potential Fluids and, especially, Very Low Polluting Potential Fluids in solvent fluids as described herein additionally provides very significant reduction in ozone formation which can not be achieved when the use of Negligibly Polluting Potential Fluids is limited by their properties. It should be also said, that use of Very Low Polluting Potential Fluids alone cannot also provide the maximum reduction in ozone formation.

However, synergistic effects providing the best reduction in ozone formation can be achieved by combining properly selected Low Polluting Potential Fluids, Very Low Polluting Potential Fluids, and Negligibly Polluting Potential Fluids. This conclusion is not limited to the specific structures of LPPF, VLPPF, and NPPF discovered by the inventors of the present invention, but also achievable with the known in the art LPPF, VLPPF, and NPPF.

As seen from examples, the use of NPPF provided ozone formation reduction to 63–65%. Addition of very low reactivity fluids provided additional reduction to 80–81% as demonstrated in the examples.

These results were achieved without additional VOC reduction which demonstrate that VOC does not correlate with ozone formation. Additionally, there is a tremendous potential in using the present invention to achieve very significant environmental benefits.

The invention has now been described in detail, and it is to be understood that the ordinary artisan in possession of the present disclosure could practice the invention, within the spirit and scope of the appended claims, other than as specifically set forth. Hence, it will be appreciated that many variations of the following preferred embodiments can be practiced:

a first preferred embodiment, which is a composition, optionally suitable for a coatings application, comprising at least one fluid, preferably an organic fluid, more preferably a liquid organic fluid, still more preferably a liquid organic fluid which is an oxygenated hydrocarbon, said fluid having a low MIR, preferably similar to or lower than that of acetone and more preferably less than that of ethane;

even more preferably also having at least one or more of the following attributes: satisfying at least one of the flash point criterion set forth herein or otherwise having a low flammability, low formation of particulates having a diameter of 2.5 μm or less, as described in more detail above, suitable evaporation rates and solvency that will be useful in a wide range of industrial applications, such as by dispersing, solvating, acting as a carrier, diluent, and the like, low toxicity such that LD50 satisfies the criteria as otherwise described herein, high thermal stability, and inertness to reaction in solution, particularly to acid or base catalyzed reactions;

and still more preferably wherein the composition comprises, includes, consists or consists essentially of a fluid selected from:
dialkyl carbonates, such as dimethyl carbonate (DMC), methyl ethyl carbonate, methyl isopropyl carbonate, methyl sec-butyl carbonate, methyl t-butyl carbonate, methyl neopentyl carbonate, and diisopropyl carbonate;
alkyl acetates, such as neopentyl acetate, ethylene glycol diacetate, 1,2-propylene glycol diacetate, 1,3-propylene glycol diacetate, 1,2-butylene glycol diacetate, 1,3-butylene glycol diacetate, 2,3-butylene glycol diacetate, neopentyl glycol diacetate;
dioxolanes such as 2,2-dimethyl dioxolane, 2,2,4-trimethyl dioxolane, 2,2,4,5-tetra methyl dioxolane;
pivalates such as methyl pivalate, isopropyl pivalate, t-butyl pivalate (TBP), neopentyl pivalate (NPP), 1,2-propylene glycol bis-pivalate (PGBP), ethylene glycol bis-pivalate, ethylene glycol monopivalate, 1,2-butylene glycol mono-pivalate (1,2-BGMP), 2,3-butylene glycol monopivalate (2,3-BGMP), 1,2-butylene glycol pivalate acetate (1,2-BGPA), 1,2-butylene glycol pivalate acetate (1,2-BGPA), 2,3-butylene glycol pivalate acetate (2,3-BGPA), ethylene glycol pivalate acetate, 1,2 propylene glycol monopivalate, neopentyl glycol mono pivalate, and 1,2-propylene glycol pivalate acetate;
isobutyrate compounds such as isopropyl isobutyrate, neopentyl isobutyrate, and neopentyl glycol mono isobutyrate; and
2,2,4,4-tetramethyl pentanonitrile (TMPN); isopropyl neononanoate; pivalonitrile; methyl 2,2,4,4-tetramethyl pentanoate (methyl neononanoate); and methyl 3,5,5 trimethyl hexanoate;
preferably wherein the composition is used in a stationary, non-combustion process, on an industrial scale, said composition also including a second fluid, wherein the second fluid has a high MIR, greater than that of acetone, and more preferably an MIR scale of >1.00; and even more preferably wherein the composition further includes at least one resin and yet still more preferably wherein the composition further comprises a pigment;

and also a composition suitable for coating a substrate, comprising one of the aforementioned fluids having a low MIR in the first embodiment above, preferably dimethyl carbonate, methyl pivalate, t-butyl pivalate, or a mixture thereof, and at least one solute, wherein said solute is preferably selected from the group consisting of resins, pigments, and mixtures thereof; and optionally also wherein the composition does not contain a halocarbon, more preferably wherein the composition contains less than 1000 ppm of any chlorocarbon or bromocarbon; and also optionally wherein the composition is not used in a combustion process, and also optionally wherein the fluid has at least one of the following attributes:
i) an MIR equal to or less than 1.5 gr of ozone produced/gr of fluid solvent;
ii) a flash point of at least −6.1° C., or the even more preferable flash points set forth herein above;
iii) a toxicity level wherein oral rat LD50 is better than at least 500 mg/kg (i.e. greater than 1000 mg/kg, or more preferably greater than 2000 mg/kg), or the even more preferable toxicity levels set forth above;
iv) a low formation of particulates less than 2.5 μm, where "low formation" is defined as less than 65 micrograms per cubic meter measured over a 24 hour period or more preferably less than 50 micrograms per cubic meter, measure over the same period;
v) an evaporation rate up to 12 relative to normal butyl acetate;
and even more particularly wherein DMC or methyl pivalate or the mixture thereof is present in an amount sufficient to bring the weight average MIR of a composition to below 1.50 and more preferably below 1.00, yet still more preferably below 0.50, still even more preferably below 0.31, and in another embodiment wherein the amount of DMC or methyl pivalate is at least 10 percent by volume, more preferably in the amount of more than 25 percent by volume, still more preferably in the amount of at least 50 percent by volume of the organic liquid in the composition, and most preferably wherein the fluid is a paint mixture containing a pigment, or mixture thereof.

Or, more particularly, this preferred embodiment relates to a non-combustion process utilizing a process fluid comprising a first fluid wherein at least some of said first fluid evaporates into the atmosphere, the improvement comprising replacing at least a portion said first fluid with a second fluid selected from dimethyl carbonate, methyl pivalate, or a mixture thereof, thereby decreasing ozone formation from atmospheric photochemical reactions; and also more preferable embodiments including: where said process fluid acts as a solvent, carrier, diluent, surface tension modifier, or any combination thereof, in said process; where said process fluid does not contain a halocarbon; where said decreasing ozone formation is based on a calculation using an MIR scale; where said process is a stationary industrial process; where said replacing results in at least one of the following improvements:

i) an MIR at least 10% less than the MIR of the process fluid prior to said replacing;
ii) the flash point or a weighted average flash point of the process fluid increasing to above −6.1° C.;
iii) a reduced toxicity level of the process fluid to greater than at least 2000 mg/kg;
iv) a measureable decrease in the formation of particulates having a diameter less than 2.5 μm produced by said process;
v) a change in the evaporation rate of the process fluid into the range of less than 12 relative to normal butyl acetate;
vi) a decrease in the decomposition of the process fluid based on reactions with acid catalysts present in said fluid; or where at least two and more preferably three, or even more preferably four, or still more preferably five and most preferably six of these properties are improved; where said replacing results in a blend of fluids, and wherein said blend has a flash point of at least greater than 15° C.; or where said blend has a flash point of at least greater than 60° C.; or where said replacing results in a reduction in the MIR of the process fluid by at least 10%; or where said reduction is at least 25%; or where said reduction is at least 50%; or where said process is a coating process comprising coating a substrate with a composition comprising at least one fluid which is intended to evaporate; and where said process provides a painted surface; where said first fluid is selected from at least one of toluene, xylenes, ethanol, n-butanol, n-pentanol, sec-butanol, propylene glycol methyl ether acetate, methyl isobutyl ketone, $C_5$–$C_{10}$ linear ketones, cyclic ketones, halocarbons, methyl t-butyl ether; mineral spirits; and especially where the second fluid is DMC, MP, or a mixture thereof; and finally where said first fluid replaced has an evaporative rate ranging from that of MEK to that of n-butyl acetate, and after said replacing the process fluid has an evaporative rate ranging from that of MEK to that of n-butyl acetate.

A second preferred embodiment is a method of selecting a fluid system used in an industrial process or for a composition manufactured by an industrial process, comprising selecting at least one fluid having a low OFP as set forth above in the first preferred embodiment, either specifically, e.g., as in DMC, or generally, e.g., with reference to ozone formation, MIR, and the like, preferably having an MIR≦1.00, more preferably ≦0.50, still more preferably ≦0.35, and most preferably ≦0.24;

and also a second fluid, not having a low OFP, preferably having an MIR>1.00, or in an embodiment selected from hydrocarbon fluids such as toluene and xylenes; alcohols such as methanol, isopropyl alcohol, diacetone alcohol, and sec-butanol; esters such as ethyl acetate, propyl acetate, butyl acetate, isobutyl isobutyrate, isoamyl isobutyrate, propylene glycol methyl ether acetate; ketones such as methyl ethyl ketone (MEK), linear ketones, preferably $C_5$–$C_{10}$ linear ketone, cyclic ketones; halocarbons, particularly chlorinated hydrocarbons; and methyl t-butyl ether (MTBE);

and wherein the selection is made so that the weight average OFP, based on any OFP scale but preferably based on the MIR scale, is equal to or less than that of acetone and even more preferably equal to or less than that of ethane, and when measured by the MIR scale is less than or equal to the preferred MIR of the blends set forth above (e.g., weight average MIR≦1.00, etc), and even more preferably wherein the blend has at least one of the aforementioned performance attributes, and/or especially wherein at least one of the following criterion renders the blend superior, in that criterion, to such a composition without a fluid according to the present invention: e.g.; blend flash point or weighted average flash point, solvency, formation of 2.5 PM, evaporation rate, toxicity, thermal stability, and inertness.

Finally, but not in the least, there is the third preferred embodiment of an improved industrial process which uses a fluid, the improvement comprising decreasing the contribution of said process to ground-based ozone formation by substituting for at least a portion of the fluid used a fluid according to the present invention, and preferably selected from any one or more of the low MIR fluids set forth in the first embodiment above, and even more preferred wherein the final fluid used in the process is a blend as set forth in the second preferred embodiment, and particularly wherein the process is one set forth herein and even more preferably wherein the process is a coating process, an extraction process, a drilling process, or the process is one used to produce a consumer product, such as a pharmaceutical or cosmetic, and preferably wherein the decrease in contribution of said process to ground-based ozone formation is such that the MIR of the process fluid, whether it be a single fluid or blend, decreases from >1.50 to less than or equal to 1.50, more preferably from >1.50 to less than or equal to 1.00, even more preferably from >1.50 to less than or equal to 0.50, and so on as set forth above. In this embodiment, it is preferred that at least one of the previously recited performance properties be absent in the initial fluid and present in the final fluid.

We claim:

1. A process for producing a low ozone forming process fluid comprising a first fluid and a second fluid selected from the group consisting of: dimethyl carbonate; methyl pivalate; methyl ethyl carbonate; methyl isopropyl carbonate; methyl neopentyl carbonate; methyl tertiary butyl carbonate; diisopropyl carbonate; neopentyl acetate; ethylene glycol diacetate; 1,2-propylene glycol diacetate; 1,3-propylene glycol diacetate; 1,2-butylene glycol diacetate; 1,3-butylene glycol diacetate; 2,3-butylene glycol diacetate; neopentyl glycol diacetate; 2,2-dimethyl dioxolane; 2,2,4-tri-methyl dioxolane; 2,2,4,5-tetramethyl dioxolane; ethyl pivalate; isopropyl pivalate; tertiary butyl pivalate; neopentyl pivalate; pivalonitrile; ethylene glycol mono-pivalate; 1,2-propylene glycol monopivalate; 1,2-butylene glycol monopivalate; 2,3-butylene glycol monopivalate; ethylene glycol pivalate acetate; ethylene glycol dipivalate; 1,2-propylene glycol pivalate acetate; 1,2-butylene glycol pivalate acetate; 1,3-butylene glycol pivalate acetate; 2,3-butylene glycol pivalate acetate; 1,2-propylene glycol dipivalate; neopentyl glycol mono pivalate; neopentyl glycol pivalate acetate; isopropyl isobutyrate; neopentyl isobutyrate; methyl 2,2,4,4-tetramethyl pentanoate (methyl neononanoate), isopropyl neononanoate; 2,2,4,4-tetramethyl pentanonitrile; neopentyl glycol monoisobutyrate; methyl sec-butyl carbonate, methyl 3,5,5 trimethyl hexanoate or a mixture thereof, thereby forming a process fluid which exhibits an ozone forming potential (OFP) which is less than the OFP of said first fluid.

2. The process according to claim 1, wherein said process fluid acts as a solvent, carrier, diluent, surface tension modifier, or any combination thereof, in said process.

3. The process according to claim 1, wherein said process fluid does not contain a halocarbon.

4. The process according to claim 1, wherein said ozone forming potential is based on a calculation using the Absolute MIR scale.

5. The process according to claim 1, wherein said process is a stationary industrial process.

6. The process according to claim 1, wherein the said process fluid exhibits the following properties:
   i) an MIR at least 10% less than the MIR of said first fluid by itself;
   ii) a flash point great than about −6.1° C.;
   iii) an LD50 toxicity level greater than about at least 500 mg/kg;
   iv) a decrease in the formation of particulates having a diameter less than 2.5 $\mu$m, and a density of less than 65 mg/m$^3$ when measured over a 24-hour period versus said first fluid; and;
   v) an evaporation rate of less than about 12 relative to normal butyl acetate;
   vi) a decrease in the extent of the decomposition of the process fluid based on reactions with acid catalysts present in said process fluid versus said first fluid.

7. The process according to claim 6, further comprising at least two of said improvements i)–vi).

8. The process according to claim 6, further comprising at least three of said attributes i)–vi).

9. The process according to claim 1, wherein said process fluid has a flash point of at least greater than 15° C.

10. The process according to claim 9, wherein said process fluid has a flash point of at least greater than 38° C.

11. The process according to claim 9, wherein said process fluid has a flash point of at least greater than 60° C.

12. The process according to claim 4, wherein said process fluid has an MIR of at least 10% less than said first fluid.

13. The process according to claim 12, wherein said process fluid has an MIR that is at least 25% less than said first fluid.

14. The process according to claim 12, wherein said process fluid has an MIR that is at least 50% less than said first fluid.

15. The process according to claim 1, wherein the second fluid has at least one of the following attributes:
   i) a flash point above −6.1° C.;
   ii) an LD50 toxicity level of better than at least 500 mg/kg;
   iii) reduced formation of particulates having a diameter less than 2.5 $\mu$m, a density of less than 65 mg/m$^3$ when measured over a 24-hour period; and
   iv) an evaporation rate to be less than 12 relative to normal butyl acetate.

16. The process according to claim 15, wherein the second fluid has at least two of said improvements i)–iv).

17. The process according to claim 15, wherein the second fluid has at least three of said attributes i)–iv).

18. The process according to claim 15, wherein said process fluid has a flash point of at least greater than 15° C.

19. The process according to claim 18, wherein said process fluid has a flash point of at least greater than 38° C.

20. The process according to claim 18, wherein said process fluid has a flash point of at least greater than 60° C.

21. The process according to claim 1, wherein said second fluid comprises dimethyl carbonate or methyl pivalate or a mixture thereof.

22. The process according to claim 21, wherein said process fluid acts as a solvent, carrier, diluent, surface tension modifier, or any combination thereof, in said process.

23. The process according to claim 21, wherein said process fluid does not contain a halocarbon.

24. The process according to claim 21, wherein said ozone forming potential is based on a calculation using the Absolute MIR scale.

25. The process according to claim 21, wherein said process is a stationary industrial process.

26. The process according to claim 21, wherein said process fluid exhibits at least one of the following properties:
   i) an MIR at least 10% less than the MIR of said first fluid;
   ii) a flash point of at least about −6.1° C.;
   iii) an LD50 toxicity level of greater than at least about 500 mg/kg;
   iv) a decrease in the formation of particulates having a diameter less than 2.5 $\mu$m, and a density of less than 65 mg/m$^3$ when measured over a 24-hour period versus said first fluid; and;
   v) an evaporation rate less than about 12 relative to normal butyl acetate;
   vi) a decrease in the extent of the decomposition of said process fluid based on reactions with acid catalysts present in said process fluid versus said first fluid.

27. The process according to claim 26, further comprising at least two of said improvements i)–vi).

28. The process according to claim 26, further comprising at least three of said attributes i)–vi).

29. The process according to claim 26, wherein said process fluid has a flash point of at least greater than 15° C.

30. The process according to claim 26, wherein said process fluid a flash point of at least greater than 38° C.

31. The process according to claim 26, wherein said process fluid has a flash point of at least greater than 60° C.

32. The process according to claim 24, wherein said process fluid has an MIR which is at least 10% less than said first fluid.

33. The process according to claim 32, wherein said process fluid has an MIR that is at least 25% less than said first fluid.

34. The process according to claim 32, wherein said process fluid has an MIR that is at least 50% less than said first fluid.

35. The process according to claim 21, wherein said process fluid has a flash point of at least greater than 15° C.

36. The process according to claim 35, wherein said process fluid has a flash point of at least greater than 38° C.

37. The process according to claim 35, wherein said process fluid has a flash point of at least greater than 60° C.

38. The process according to claim 1, wherein said second fluid comprises methyl tertiary butyl carbonate, tertiary butyl pivalate, or pivalonitrile or a mixture thereof.

39. The process according to claim 38, wherein said process fluid acts as a solvent, carrier, diluent, surface tension modifier, or any combination thereof, in said process.

40. The process according to claim 38, wherein said process fluid does not contain a halocarbon.

41. The process according to claim 38, wherein said ozone forming potential is based on a calculation using the Absolute MIR scale.

42. The process according to claim 38, wherein said process is a stationary industrial process.

43. The process according to claim 38, wherein said process fluid exhibits at least one of the following properties:
  i) an MIR at least 10% less than the MIR of said first fluid;
  ii) a flash point of at least about −6.1° C.;
  iii) an LD50 toxicity level greater than at least 500 mg/kg;
  iv) a decrease in the formation of particulates having a diameter less than 2.5 μm, and a density of less than 65 mg/m³ when measured over a 24-hour period versus said first fluid; and;
  v) an evaporation rate less than 12 relative to normal butyl acetate;
  vi) a decrease in the extent of the decomposition of said process fluid based on reactions with acid catalysts present in said process fluid versus said first fluid.

44. The process according to claim 43, further comprising at least two of said improvements i)–vi).

45. The process according to claim 43, further comprising at least three of said attributes i)–vi).

46. The process according to claim 43, wherein said process fluid has a flash point of at least greater than 15° C.

47. The process according to claim 43, wherein said process fluid has a flash point of at least greater than 38° C.

48. The process according to claim 43, wherein said process fluid has a flash point of at least greater than 60° C.

49. The process according to claim 41, wherein said process fluid has an MIR which is at least 10% less than said first fluid.

50. The process according to claim 49, wherein said process fluid has an MIR which is at least 25% less than said first fluid.

51. The process according to claim 49, wherein said process fluid has an MIR which is at least 50% less than said first fluid.

52. The process according to claim 38, wherein the second fluid has at least one of the following attributes:
  i) a flash point above −6.1° C.;
  ii) an LD50 toxicity level of better than at least 500 mg/kg;
  iii) reduced formation of particulates having a diameter less than 5 μm, a density of less than 65 mg/M³ when measured over a 24-hour period; and
  iv) an evaporation rate to be less than 12 relative to normal butyl acetate.

53. The process according to claim 52, wherein the second fluid has at least two of said improvements i)–iv).

54. The process according to claim 52, wherein the second fluid has at least three of said attributes i)–iv).

55. The process according to claim 38, wherein said process fluid has a flash point of at least greater than 15° C.

56. The process according to claim 55, wherein said process fluid has a flash point of at least greater than 38° C.

57. The process according to claim 55, wherein said process fluid has a flash point of at least greater than 60° C.

58. The process according to claim 1, wherein said second fluid comprises ethylene glycol dipivalate, diisopropyl carbonate, methyl ethyl carbonate, ethyl pivalate, ethylene glycol pivalate acetate, neopentyl pivalate, neopentyl glycol diacetate, methyl neopentyl carbonate, 1,3-propylene glycol diacetate, neo pentyl isobutyrate, ethylene glycol diacetate, 1,2-propylene glycol monopivalate, 1,2-propylene glycol pivalate acetate, 1,2-butylene glycol monopivalate, neopentyl acetate, methyl isopropyl carbonate, isopropyl isobutyrate, 1,2-butylene glycol pivalate acetate, 2,3-butylene glycol monopivalate, 2,3-butylene glycol pivalate acetate, or isopropyl pivalate, or a mixture thereof.

59. The process according to claim 58, wherein said process fluid acts as a solvent, carrier, diluent, surface tension modifier, or any combination thereof, in said process.

60. The process according to claim 58, wherein said process fluid does not contain a halocarbon.

61. The process according to claim 58, wherein said ozone forming potential is based on a calculation using the Absolute MIR scale.

62. The process according to claim 58, wherein said process is a stationary industrial process.

63. The process according to claim 58, wherein said process fluid exhibits at least one of the following properties:
  i) an MIR at least 10% less than the MIR of said first fluid;
  ii) a flash point of at least about −6.1° C.;
  iii) an LD50 toxicity level greater than at least 500 mg/kg;
  iv) a decrease in the formation of particulates having a diameter less than 2.5 μm, and a density of less than 65 mg/m³ when measured over a 24-hour period versus said first fluid; and;
  v) an evaporation rate less than 12 relative to normal butyl acetate;
  vi) a decrease in the extent of the decomposition of the process fluid based on reactions with acid catalysts present in said process fluid versus said first fluid.

64. The process according to claim 63, further comprising at least two of said improvements i)–vi).

65. The process according to claim 63, further comprising at least three of said attributes i)–vi).

66. The process according to claim 63, wherein said process fluid has a flash point of at least greater than 15° C.

67. The process according to claim 63, wherein said process fluid has a flash point of at least greater than 38° C.

68. The process according to claim 63, wherein said process fluid has a flash point of at least greater than 60° C.

69. The process according to claim 61, wherein said process fluid has an MIR which is at least 10% less than the MIR of said first fluid.

70. The process according to claim 69, wherein said process fluid has an MIR which is at least 25% less than the MIR of said first fluid.

71. The process according to claim 69, wherein said process fluid has an MIR which is at least 50% less than the MIR of said first fluid.

72. The process according to claim 58, wherein the second fluid has at least one of the following attributes:
  i) a flash point above −6.1° C.;
  ii) an LD50 toxicity level of better than at least 500 mg/kg;
  iii) reduced formation of particulates having a diameter less than 2.5 μm, a density of less than 65 mg/m³ when measured over a 24-hour period; and
  iv) an evaporation rate less than 12 relative to normal butyl acetate.

73. The process according to claim 72, wherein the second fluid has at least two of said improvements i)–iv).

74. The process according to claim 72, wherein the second fluid has at least three of said attributes i)–iv).

75. The process according to claim 58, wherein said process fluid has a flash point of at least greater than 15° C.

76. The process according to claim 75, wherein said process fluid has a flash point of at least greater than 38° C.

77. The process according to claim 75, wherein said process fluid has a flash point of at least greater than 60° C.

78. The process according to claim 1, wherein said second fluid comprises neopentyl glycol monopivalate, 1,2-propylene glycol diacetate, 1,2-butylene glycol diacetate, methyl secondary butyl carbonate, methyl sec-butyl carbonate, 2,3-butylene glycol diacetate, ethylene glycol mono pivalate, methyl 3,5,5 trimethyl hexanoate, or 1,3-butylene glycol diacetate or a mixture thereof.

79. The process according to claim 78, wherein said process fluid acts as a solvent, carrier, diluent, surface tension modifier, or any combination thereof, in said process.

80. The process according to claim 78, wherein said process fluid does to contain a halocarbon.

81. The process according to claim 78, wherein said ozone forming potential is based on a calculation using the Absolute MIR scale.

82. The process according to claim 78, wherein said process is a stationary industrial process.

83. The process according to claim 78, wherein said process fluid exhibits at least one of the following properties:
   i) an MIR at least 10% less than the MIR of said process fluid;
   ii) a flash point of at least about −6.1° C.;
   iii) an LD50 toxicity level of greater than at least 500 mg/kg;
   iv) a decrease in the formation of particulates having a diameter less than 2.5 μm, and a density of less than 65 mg/M$^3$ when measured over a 24-hour period versus said first fluid; and;
   v) an evaporation rate of less than 12 relative to normal butyl acetate;
   vi) a decrease in the extent of the decomposition of said process fluid based on reactions with acid catalysts present in said process fluid versus said first fluid.

84. The process according to claim 83, further comprising at least two of said improvements i)–vi).

85. The process according to claim 83, further comprising at least three of said attributes i)–vi).

86. The process according to claim 83, wherein said process fluid has a flash point of at least greater than 15° C.

87. The process according to claim 83, wherein said process fluid has a flash point of at least greater than 38° C.

88. The process according to claim 83, wherein said process fluid has a flash point of at least greater than 60° C.

89. The process according to claim 81, wherein said process fluid has an MIR which is at least 10% less than the MIR of said first fluid.

90. The process according to claim 89, wherein said process fluid has an MIR which is at least 25% less than the MIR of said first fluid.

91. The process according to claim 89, wherein said process fluid has an MIR which is at least 50% less than the MIR of said first fluid.

92. The process according to claim 78, wherein the second fluid has at least one of the following attributes:
   i) a flash point above −6.1° C.;
   ii) an LD50 toxicity level of better than at least 500 mg/kg;
   iii) reduced formation of particulates having a diameter less than 2.5 μm, a density of less than 65 mg/m$^3$ when measured over a 24-hour period; and
   iv) an evaporation rate less than 12 relative to normal butyl acetate.

93. The process according to claim 92, wherein the second fluid has at least two of said improvements i)–iv).

94. The process according to claim 92, wherein the second fluid has at least three of said attributes i)–iv).

95. The process according to claim 78, wherein said process fluid has a flash point of at least greater than 15° C.

96. The process according to claim 95, wherein said process fluid has a flash point of at least greater than 38° C.

97. The process according to claim 95, wherein said process has a flash point of at least greater than 60° C.

98. The process according to claim 1, wherein said first fluid is selected from the group consisting of: branched $C_6$–$C_9$ alkanes, straight chain alkanes, cycloaliphatic $C_6$–$C_{10}$ hydrocarbons, natural hydrocarbons, ethanol, propanol and higher nontertiary alcohols, $C_3$ and higher ethers, ether alcohols, ether alcohol acetates, ethyl ethoxy propionate, $C_5$ and higher ketones, cyclic ketones, aromatic hydrocarbon $C_7$+, halocarbons, cyclic ethers, and mineral spirits.

99. The process according to claim 1, wherein said first fluid is selected from the group consisting of: primary or secondary $C_4$ and higher alcohols, ethanol, propanol, ether alcohol or mixtures thereof and said second fluid is selected from the group consisting of: methanol and isopropanol.

* * * * *